(12) United States Patent
Fujii

(10) Patent No.: US 7,779,724 B2
(45) Date of Patent: Aug. 24, 2010

(54) ELECTRICAL BICYCLE SHIFT CONTROL DEVICE

(75) Inventor: Kazuhiro Fujii, Kawachinagano (JP)

(73) Assignee: Shimano Inc., Osaka (JP)

( * ) Notice: Subject to any disclaimer, the term of this patent is extended or adjusted under 35 U.S.C. 154(b) by 1302 days.

(21) Appl. No.: 10/826,272

(22) Filed: Apr. 19, 2004

(65) Prior Publication Data

US 2005/0229735 A1    Oct. 20, 2005

(51) Int. Cl.
*B62K 21/12* (2006.01)
*B62J 3/00* (2006.01)
*B62J 6/00* (2006.01)

(52) U.S. Cl. ............... 74/551.8; 74/473.13; 74/473.14; 74/473.3; 74/473 XY; 200/4; 340/432; 474/70; 474/78; 474/80; 192/217

(58) Field of Classification Search ............... 74/551.8, 74/473.3, 473.13, 473.14, 471 XY; 192/217; 439/34; 242/400.1; 340/432; 200/4; 474/70, 474/78, 80; *B62J 39/00*
See application file for complete search history.

(56) References Cited

U.S. PATENT DOCUMENTS

| 4,032,168 | A | * | 6/1977 | Emerson ...................... 280/279 |
| 4,143,557 | A | | 3/1979 | Wakebe et al. |
| 4,489,307 | A | * | 12/1984 | Nagano ....................... 340/432 |
| 4,900,291 | A | | 2/1990 | Patterson |
| 5,358,451 | A | | 10/1994 | Lacombe et al. |
| 5,400,675 | A | | 3/1995 | Nagano |
| 5,470,277 | A | | 11/1995 | Romano |
| 5,653,649 | A | | 8/1997 | Watarai |
| 5,678,455 | A | | 10/1997 | Watarai |
| 5,768,945 | A | | 6/1998 | Ose |
| 5,941,125 | A | | 8/1999 | Watarai et al. |
| 6,015,036 | A | | 1/2000 | Fukuda |
| 6,038,923 | A | | 3/2000 | Lin |
| 6,073,730 | A | | 6/2000 | Abe |
| 6,204,752 | B1 | * | 3/2001 | Kishimoto .................. 340/432 |

(Continued)

FOREIGN PATENT DOCUMENTS

DE    42 02 323 A1    7/1992

(Continued)

OTHER PUBLICATIONS

Mavic All Catalogue 1999; Published in Japan before Nov. 5, 1998.

*Primary Examiner*—Vinh T. Luong
(74) *Attorney, Agent, or Firm*—Global IP Counselors, LLP

(57) ABSTRACT

An electrical bicycle shift control assembly is provided that includes at least one electrical bicycle shift control device. The shift control device includes a handlebar mounting portion configured to be clamped onto a handlebar and an electrical shift control switch portion. The electrical switch portion has an operating member arranged to move relative to the handlebar mounting portion between a neutral position and an actuating position. Preferably, the electrical switch portion is detachably coupled to the handlebar mounting portion via a mating mounting structure to be removable from the handlebar mounting portion without removing the handlebar mounting portion from the handlebar. Preferably, a bicycle computer unit including a display screen is supported by the handlebar mounting portion. The operating member can include a dial-shaped element or a lever-shaped element that is configured to rotate about an operating axis.

30 Claims, 12 Drawing Sheets

U.S. PATENT DOCUMENTS

| | | | |
|---|---|---|---|
| 6,216,078 B1 | 4/2001 | Jinbo et al. | |
| 6,227,068 B1 | 5/2001 | Masui et al. | |
| 6,305,241 B1 * | 10/2001 | Masui et al. | 74/551.8 |
| 6,331,089 B1 * | 12/2001 | Iteya | 403/56 |
| 6,523,772 B2 * | 2/2003 | Ueno | 242/400.1 |
| 6,546,827 B2 | 4/2003 | Irie | |
| 6,584,872 B1 * | 7/2003 | Kojima | 74/551.8 |
| 6,698,307 B2 | 3/2004 | Wesling et al. | |
| 6,734,376 B2 * | 5/2004 | Ichida et al. | 200/4 |
| 6,774,771 B2 * | 8/2004 | Takeda | 340/432 |
| 6,991,081 B2 * | 1/2006 | Uno et al. | 192/217 |
| 7,448,297 B2 * | 11/2008 | Tiong | 74/551.8 |
| 7,490,965 B2 * | 2/2009 | Okada et al. | 362/473 |
| 2001/0053724 A1 | 12/2001 | Campagnolo | |
| 2002/0020249 A1 * | 2/2002 | Darland et al. | 74/551.8 |
| 2003/0019712 A1 | 1/2003 | Dal Pra' | |
| 2003/0074997 A1 | 4/2003 | Wesling et al. | |
| 2004/0115962 A1 * | 6/2004 | Kitamura et al. | 439/34 |

FOREIGN PATENT DOCUMENTS

| | | |
|---|---|---|
| DE | 19642906 A1 | 4/1997 |
| EP | 1 065 140 A2 | 1/2001 |
| EP | 1225123 A1 | 7/2002 |
| EP | 1375325 A2 | 1/2004 |
| FR | 2654698 A1 | 5/1991 |
| JP | 60-85297 U | 6/1985 |
| JP | 5-338581 A | 12/1993 |

* cited by examiner

ELECTRICAL BICYCLE SHIFT CONTROL DEVICE

BACKGROUND OF THE INVENTION

1. Field of the Invention

This invention generally relates to an electrical bicycle shift control device. More specifically, the present invention relates to an electrical shift control assembly, which has at least one electrical shift control device clamped onto the handlebar to provide at least one additional location to control shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shifting mechanism.

In the past, the operating force applied by the fingers to a shift control lever was transmitted to the drive component of a bicycle shifting mechanism by a cable that was fixed at one end to the control lever. More recently, electric switches mounted on the handlebar have been used instead of mechanical control levers in order to operate the bicycle shifting mechanism. For example, as shown in Japanese Laid-Open Patent Application No. 5-338581 and U.S. Pat. No. 5,358,451, a plurality of electric switches may be provided at a plurality of handlebar locations in order to allow for quicker shifts and to enhance responsiveness. However, it is often inconvenient to move the hands around the handlebar to operate the brakes and the electric switches depending on the hand position at a given time. Additionally, these typical braking devices and/or electric switches can be difficult or at least cumbersome to assemble and install on the bicycle. Furthermore, these typical braking devices and/or electric switches can be unsightly.

In view of the above, it will be apparent to those skilled in the art from this disclosure that there exists a need for an improved electrical bicycle shift control assembly with an improved electrical shift control device. This invention addresses this need in the art as well as other needs, which will become apparent to those skilled in the art from this disclosure.

SUMMARY OF THE INVENTION

One object of the present invention is to provide a combination brake control and electrical bicycle shift control system/assembly that allows the rider to operate various bicycle control devices without difficulty by positioning control devices at various convenient locations.

Another object of the present invention is to provide an electrical bicycle shift control device for the control system/assembly that is relatively easy and convenient to operate, particularly near the center of the transverse portion of the bicycle handlebar.

Another object of the present invention is to provide at least one electrical bicycle shift control device for the control system/assembly that supports the bicycle computer of the control system/assembly.

Still another object of the present invention is to provide an electrical bicycle shift control device for the control system that is relatively simple and inexpensive to manufacture and assemble.

Yet still another object of the present invention is to provide an electrical bicycle shift control device for the control system that is relatively easy to attach to the bicycle handlebar.

The foregoing objects can basically be attained by providing an electrical bicycle shift control device comprising a handlebar mounting portion and an electrical shift control switch portion. The handlebar mounting portion is configured to be clamped onto a handlebar and includes a switch mounting structure. The electrical shift control switch portion includes a mating mounting structure detachably coupled to the switch mounting structure of handlebar mounting portion and an operating member arranged and configured to move relative to the handlebar mounting portion between a neutral position and a first actuating position. The mating mounting structure of the electrical shift control switch portion cooperates with the switch mounting structure such that the electrical control switch portion is removable from the handlebar mounting portion without removing the handlebar mounting portion from the handlebar.

The foregoing objects can also basically be attained by providing an electrical bicycle shift control assembly comprising a first shift control device and a bicycle computer unit. The first shift control device includes a first handlebar mounting portion configured to be clamped onto a handlebar and a first electrical shift control switch portion mounted to the first handlebar mounting portion. The bicycle computer unit including a display screen is supported by the first handlebar mounting portion.

The foregoing objects can also basically be attained by providing an electrical bicycle shift control device comprising a handlebar mounting portion and an electrical shift control switch portion. The handlebar mounting portion is configured to be clamped onto a handlebar. The electrical shift control switch portion is coupled to the handlebar mounting portion. The electrical shift control switch portion includes an operating member arranged and configured to move relative to the handlebar mounting portion between a neutral position and a first actuating position. The operating member includes a dial-shaped element that is configured and arranged to rotate about an operating axis to move the operating member between the neutral position and the first actuating position.

The foregoing objects can also basically be attained by providing an electrical bicycle shift control device comprising a handlebar mounting portion and an electrical shift control switch portion. The handlebar mounting portion is configured to be clamped onto a handlebar. The electrical shift control switch portion is coupled to the handlebar mounting portion. The electrical shift control switch portion includes an operating member arranged and configured to move relative to the handlebar mounting portion between a neutral position and a first actuating position. The operating member includes a lever-shaped element that is configured and arranged to rotate about an operating axis to move the operating member between the neutral position and the first actuating position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
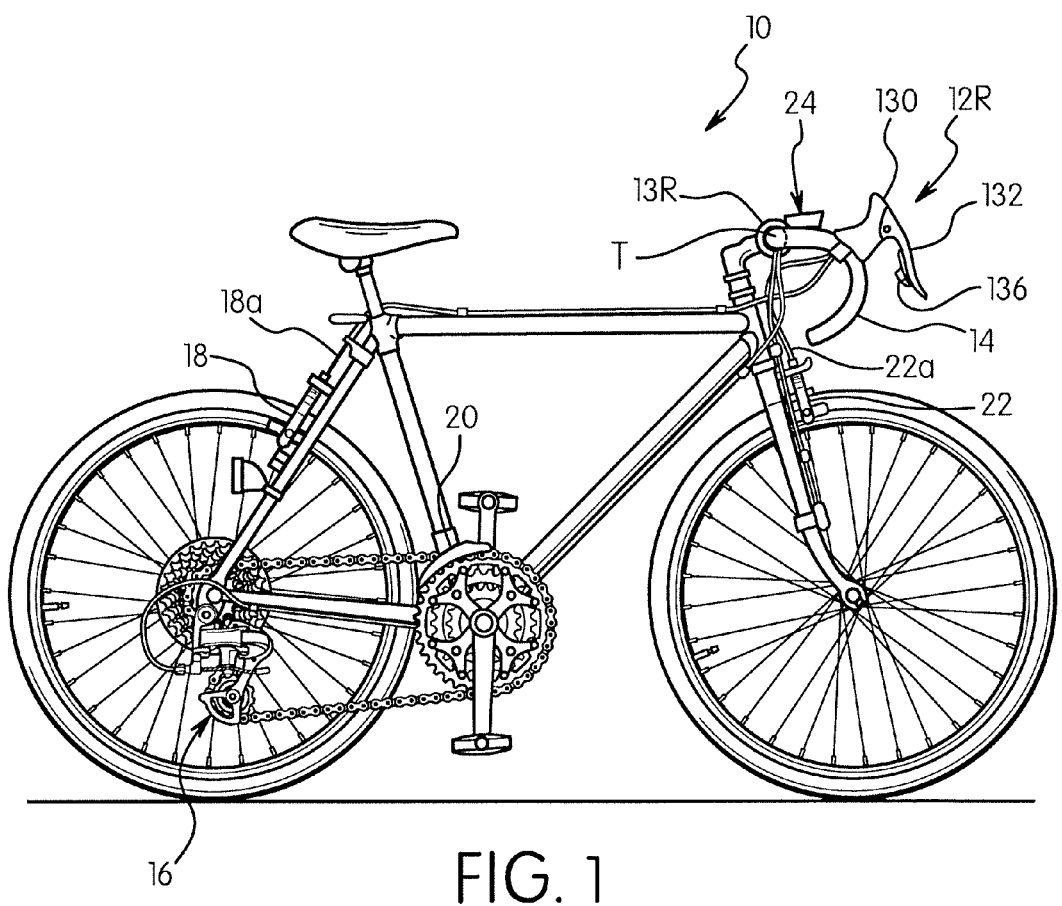
FIG. 1 is a side elevational view of a bicycle equipped with a pair of brake/shift control devices (only one shown) coupled to the handlebar and a pair of additional electrical shift control devices (only one shown) mounted to the transverse portion of the handlebar in accordance with a first preferred embodiment of the present invention.
Figure 2:
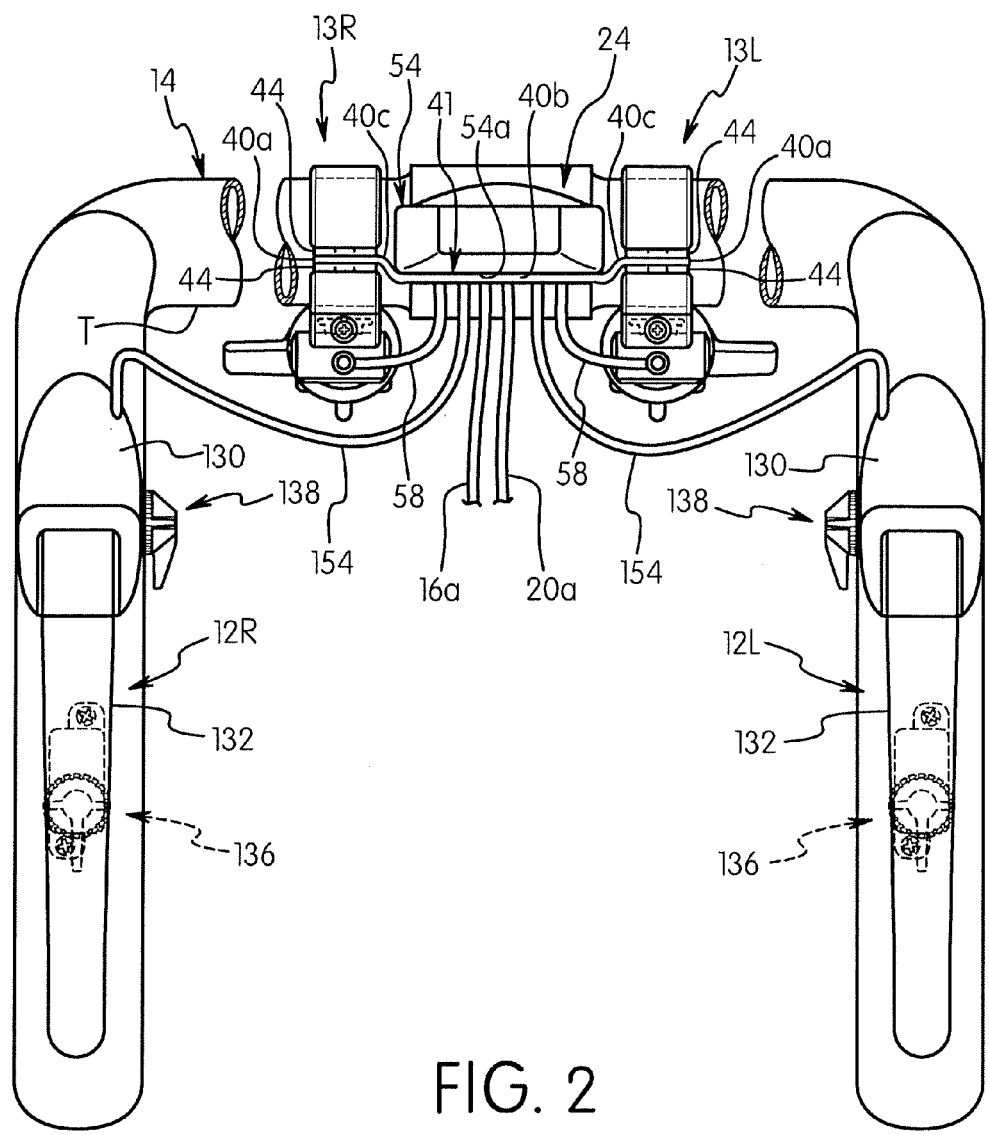
FIG. 2 is a partial enlarged front elevational view of the handlebar of the bicycle illustrated in FIG. 1 with the bicycle computer and the right and left side control devices (i.e., a brake and shift control system/assembly) coupled thereto in accordance with the present invention.

Referring initially to FIGS. 1 and 2, a bicycle 10 is illustrated with a pair of electrical shift/brake control devices 12R and 12L (only one shown in FIG. 1) and a pair of additional electrical shift control devices 13R and 13L (only one shown in FIG. 1) mounted on a bicycle handlebar 14 in accordance with the present invention. The electrical shift/brake control devices 12R and 12L and the additional electrical shift control devices 13R and 13L form parts of a brake and shift control system or assembly of the bicycle 10 in accordance with the present invention. The additional electrical shift control devices 13R and 13L are preferably mounted to a central transverse portion T of the handlebar 14 in accordance with the present invention, as explained below. The transverse portion T is preferably straight (i.e., linear).

The right and left hand side control devices 12R and 12L are essentially identical in construction and operation, except that that are mirror images. Moreover, the parts of right and left hand side control devices 12R and 12L that are identical or mirror images will be given the same reference numerals for the sake of brevity. The additional shift control devices 13R and 13L are also essentially identical in construction and operation, except that that are mirror images. Thus, only one of the shift control devices 13R and 13L will be discussed and illustrated herein. Moreover, the parts of right and left hand side shift control devices 13R and 13L that are identical or mirror images will be given the same reference numerals for the sake of brevity.

The right hand side control device 12R is operatively coupled to a rear derailleur 16 via a bicycle computer unit 24, while the left hand side control device 12L is operatively coupled to a front derailleur 20 via the bicycle computer unit 24. The additional right hand side shift control device 13R is also operatively coupled to the rear derailleur 16 via the bicycle computer unit 24, while the additional left hand side shift control device 13L is also operatively coupled to the front derailleur 20 via the bicycle computer unit 24. Additionally, the right hand side control device 12R is preferably directly mechanically coupled to a rear brake device 18 via a brake cable 18a, while the left hand side control device 12L is preferably directly mechanically coupled to a front brake device 22 via a brake cable 22a. The cycle computer unit 24 also forms a part of the brake and shift control system or assembly of the bicycle 10 mentioned above. The cycle computer unit 24 operates the rear and front derailleurs 16 and 20 via electrical wires 16a and 20a in a conventional manner. Preferably, at least one of the additional electrical shift control devices 13R and 13L supports the cycle computer unit 24, as explained below.

The brake and shift control system of the bicycle 10 controls the rear derailleur 16, the rear brake device 18, the front derailleur 20 and the front brake device 22. In particular, the brake and shift control system of the bicycle 10 mechanically controls the rear brake device 18 and the front brake device 22, while the brake and shift control system of the bicycle 10 electronically controls the rear derailleur 16 and the front derailleur 20. Thus, the brake and shift control system of the bicycle 10 preferably includes a conventional mechanical brake control system as well as an electrical shift control system or assembly in accordance with the present invention, as explained below.

Since most of the parts of the bicycle 10 are well known in the art, the parts of the bicycle 10 will not be discussed or illustrated in detail herein, except for the parts relating to the present invention. Moreover, various conventional bicycle parts, which are not illustrated and/or discussed in detail herein, can also be used in conjunction with the present invention. In other words, it will be apparent to those skilled in the art from this disclosure that various modifications can be made to the various parts of the bicycle 10 without departing from the present invention, as needed and/or desired.

Referring now to FIGS. 2-11, the additional electrical shift control devices 13R and 13L will now be discussed in more detail. Basically, each of the shift control devices 13R and 13L includes a handlebar mounting portion 30 and an electrical shift control switch portion 32. The handlebar mounting portion 30 is configured to be clamped onto the transverse portion T of the handlebar 14. The electrical shift control switch portion 32 is detachably coupled to the handlebar mounting portion 30 via a protrusion and recess arrangement and a threaded fastener or screw 34. The parts of the protrusion and recess arrangement will be discussed in more detail below.

For the sake of convenience, the "electrical shift control switch portion 32" will also simply be referred to as "the electrical switch portion 32" hereinafter. When the fastener 34 is removed, the electrical (shift control) switch portions 32 can be removed from the handlebar mounting portions 30 without removing the handlebar mounting portions 30 from the handlebar 14. The electrical (shift control) switch portions 32 of the shift control devices 13R and 13L are utilized by the rider to shift the rear derailleur 16 and the front derailleur 20, respectively.

Referring mainly to FIGS. 2-7, the handlebar mounting portion 30 basically includes a tubular clamping member 36, a switch mounting structure 38 and a computer support leg 40. The switch mounting structure 38 is fixedly coupled to the tubular clamping member 36, while the computer support leg 40 is removably coupled to the tubular clamping member 36. The electrical switch portion 32 is detachably coupled to the switch mounting structure 38 of the handlebar mounting portion 30, as explained below in more detail. Preferably, the switch mounting structure 38 and the tubular clamping member 36 are integrally formed together as a one-piece, unitary member of a lightweight, rigid material such as cast aluminum or hard plastic.

Figure 7:
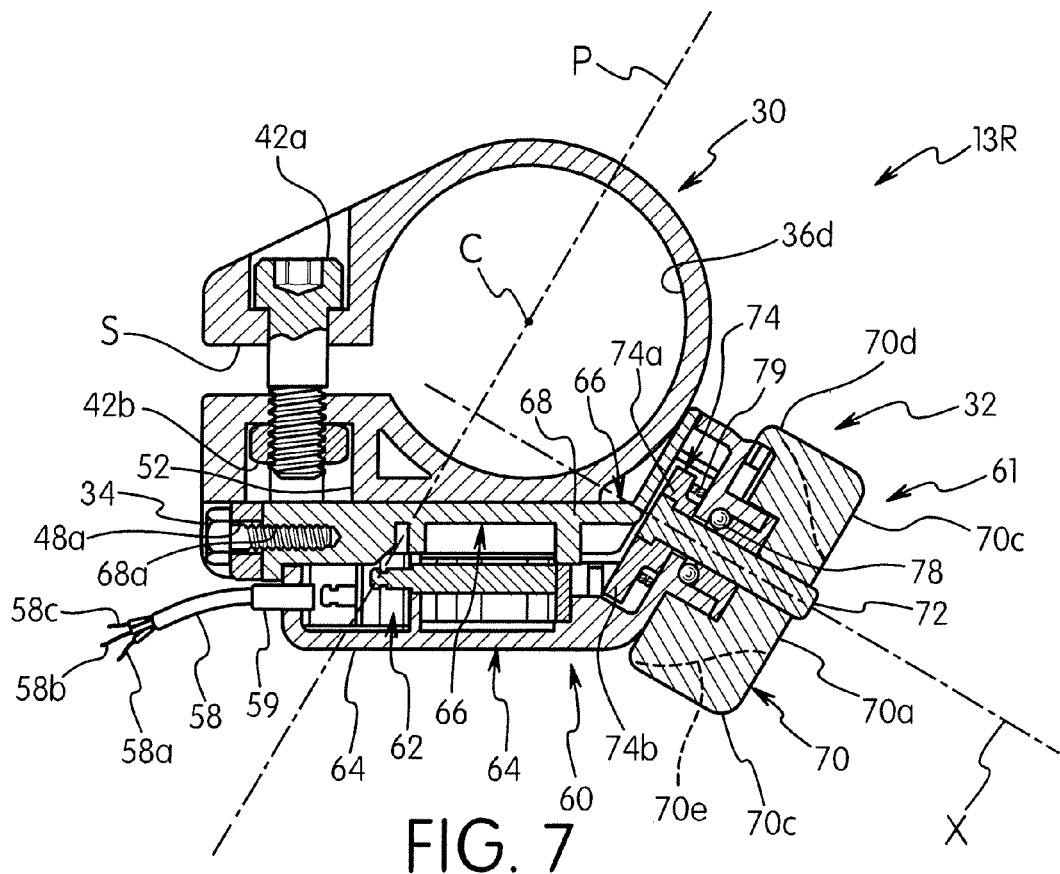
FIG. 7 is a cross-sectional view of the right hand side additional electrical shift control device illustrated in FIGS. 3-6 as seen along section line 7-7 of FIG. 6.

The tubular clamping member 36 includes a first attachment end 36a, a second attachment end 36b and a band section 36c extending between the attachment ends 36a and 36b to form a split S between the first and second attachment ends 36a and 36b, as seen in FIG. 7. A bolt 42a and a nut 42b couple the attachment ends 36a and 36b together to mount the tubular clamping member 36 on the handlebar 14. Specifically, the nut 42b is non-rotatably coupled to the second attachment end 36b, while the bolt 42a is rotatably coupled to the first attachment end 36a. Thus, rotation of the bolt 42a causes the attachment ends 36a and 36b to move toward each other to reduce the effective inner diameter of a curved mounting surface 36d of the band section 36c. The curved surface 36d contacts the outer surface of the handlebar 14. Accordingly, the tubular clamping member 36 is clamped onto the handlebar 14.

The computer support leg 40 is mounted on the bolt 42a between the attachment ends 36a and 36b. Specifically, a pair of resilient members 44 (e.g. rubber washers) are arranged on opposite sides of the computer support leg 40 such that the support leg 40 is securely held between opposing surfaces of the attachment ends 36a and 36b on the bolt 42a. The resilient members 44 are deformable such that the computer support leg 40 and the members 44 do not interfere with securing the tubular clamping member 36 onto the handlebar 14. In other words, the resilient members will deform to become effectively thinner if needed in order to securely clamp the tubular clamping member 36 onto the handlebar 14.

The computer support leg 40 basically includes a bicycle attachment end 40a, a computer attachment end 40b and a bent section 40c disposed between the bicycle attachment end 40a and the computer attachment end 40b. The bicycle attachment end 40a has opposed flat surfaces with a through hole extending therebetween for receiving the bolt 42a. The computer attachment end 40b is releasably coupled to the cycle computer by a snap-fit or using fasteners (not shown) in a conventional manner. The bent section 40c is configured and arranged such that the bicycle computer unit 24 is longitudinally offset from the band section 36c of the tubular clamping portion 36.

Figure 3:
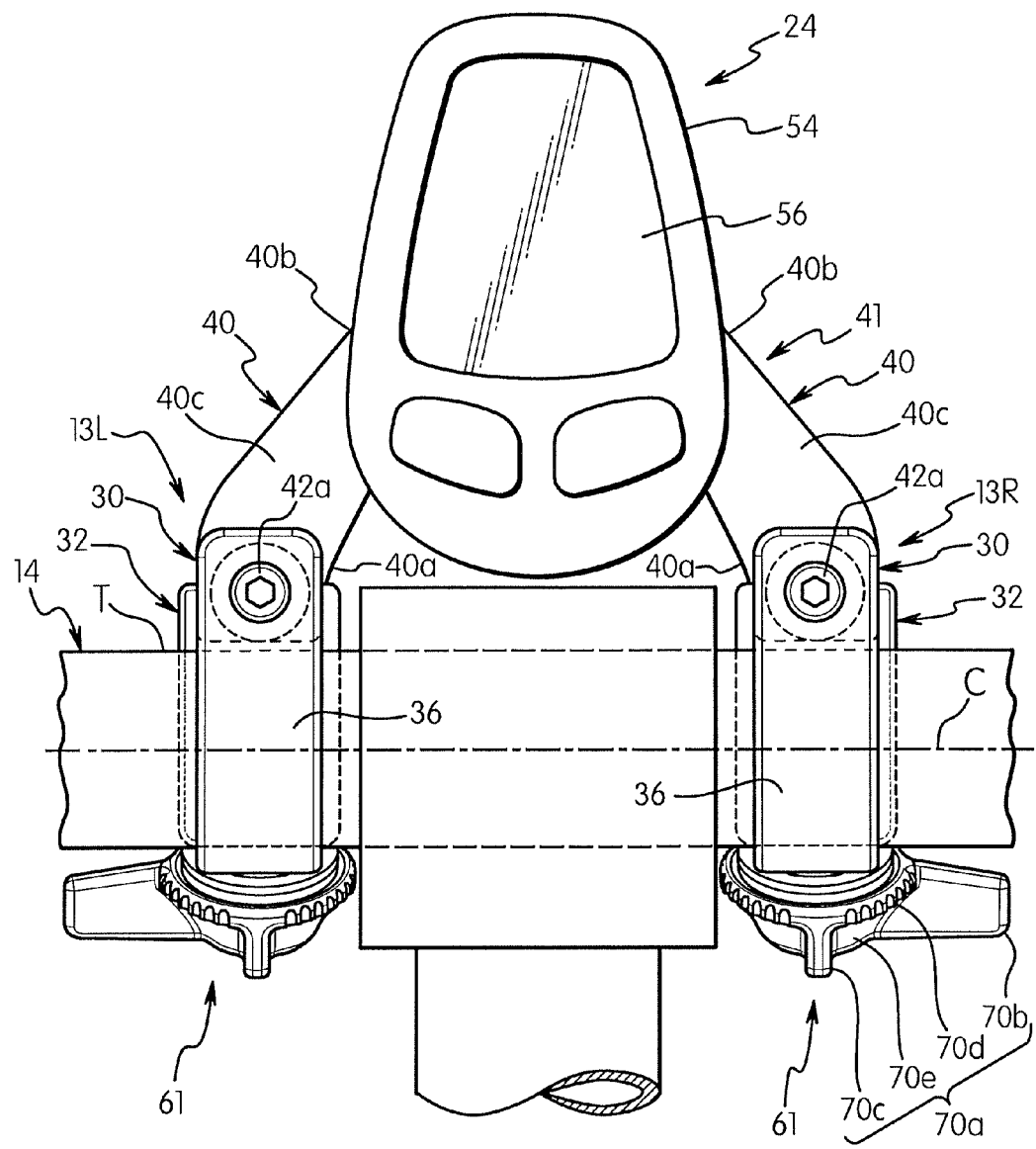
FIG. 3 is an enlarged top plan view of the center portion of the handlebar illustrated in FIG. 2 with the additional electrical shift control devices and the bicycle computer coupled thereto in accordance with the present invention.
Figure 4:
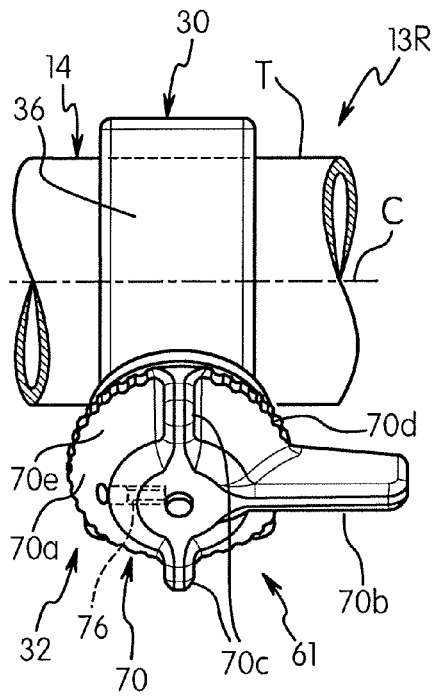
FIG. 4 is a partial, rear elevational view of the right hand side additional electrical shift control device and handlebar illustrated in FIG. 3.
Figure 5:
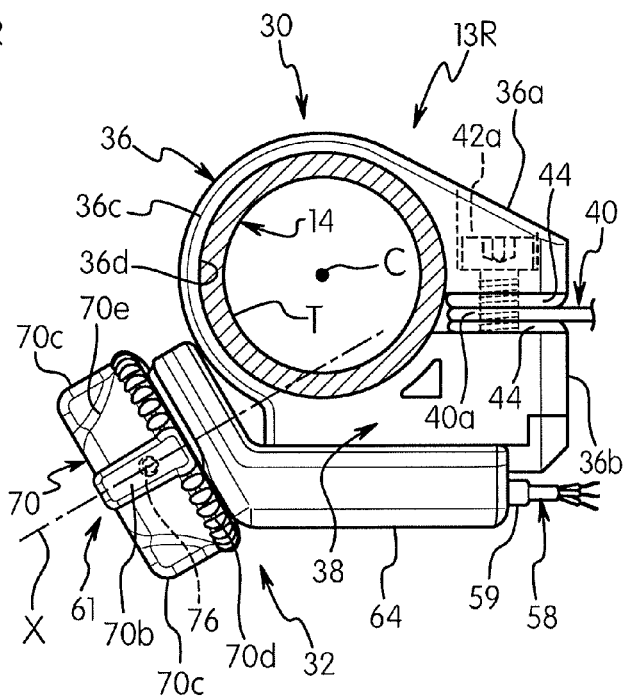
FIG. 5 is a right side elevational view of the right hand side additional electrical shift control device and the portion of the handlebar illustrated in FIG. 4.
Figure 6:
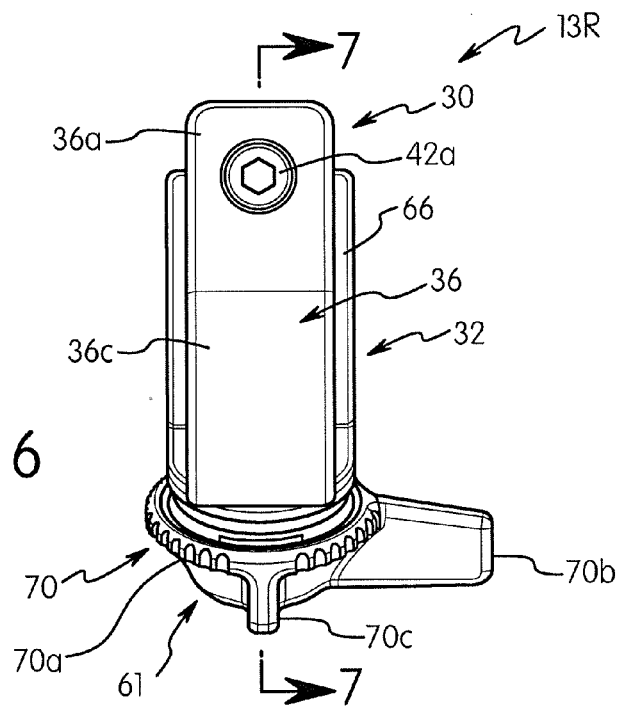
FIG. 6 is a top plan view of the right hand side additional electrical shift control device illustrated in FIGS. 3-5, with the handlebar removed for the purpose of illustration.

In the illustrated embodiment, the computer support legs 40 of the additional shift control devices 13R and 13L are preferably integrally formed together as a one-piece, unitary computer support member 41 that has a substantially U-shaped configuration, as best seen in FIGS. 2 and 3. Thus, the computer attachment end 40b of one of the computer support legs 40 is preferably common to the other computer support leg 40. However, it will be apparent to those skilled in the art from this disclosure that the computer support legs 40 could be formed as separate members, and/or that one of the computer support legs 40 could be completely eliminated if needed and/or desired. If one of the computer support legs 40 is eliminated, it will be apparent to those skilled in the art from this disclosure that the single computer support leg 40 could be integrally formed with the tubular clamping member 36 of one of the shift control devices 13R and 13L, as discussed below with reference to another embodiment of the present invention. In any case, the computer support leg or legs 40 are preferably configured and arranged such that the bicycle computer unit 24 is longitudinally offset from the band sections 36c along the handlebar 14, as best seen in FIGS. 2 and 3.

Figure 9:
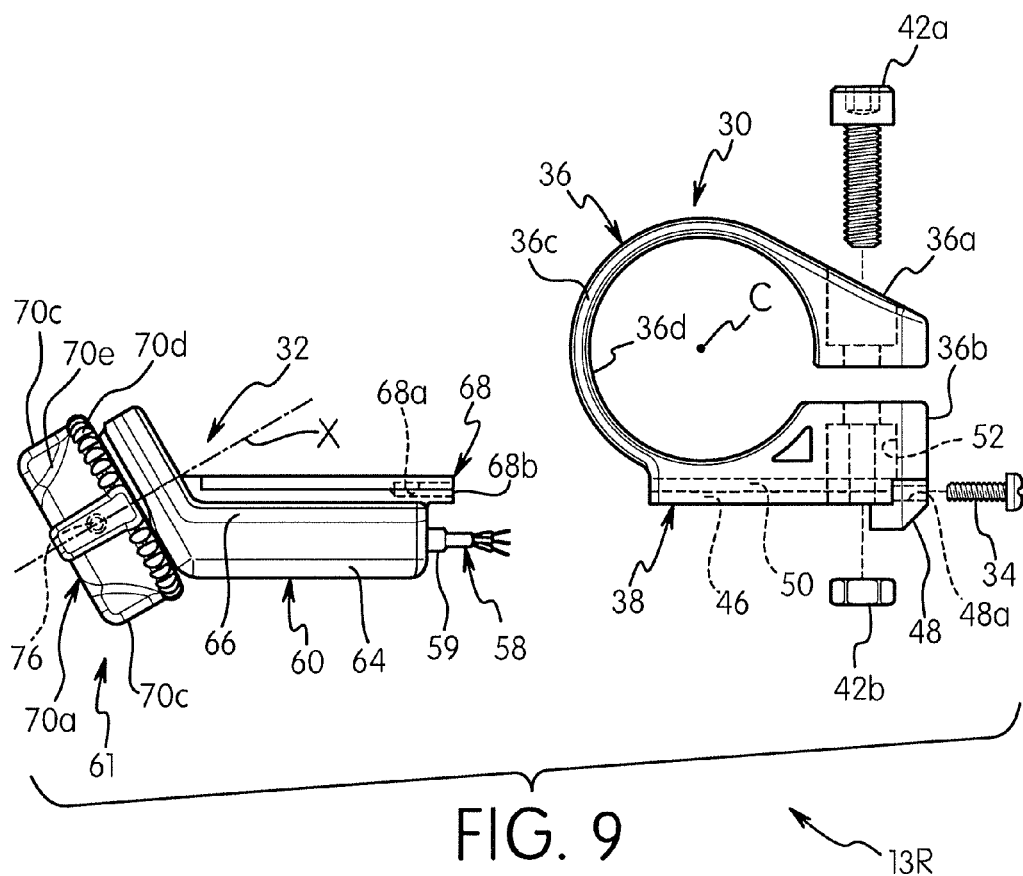
FIG. 9 is a partially exploded right side elevational view of the right hand side additional electrical shift control device illustrated in FIGS. 4-7.
Figures 10, 11:
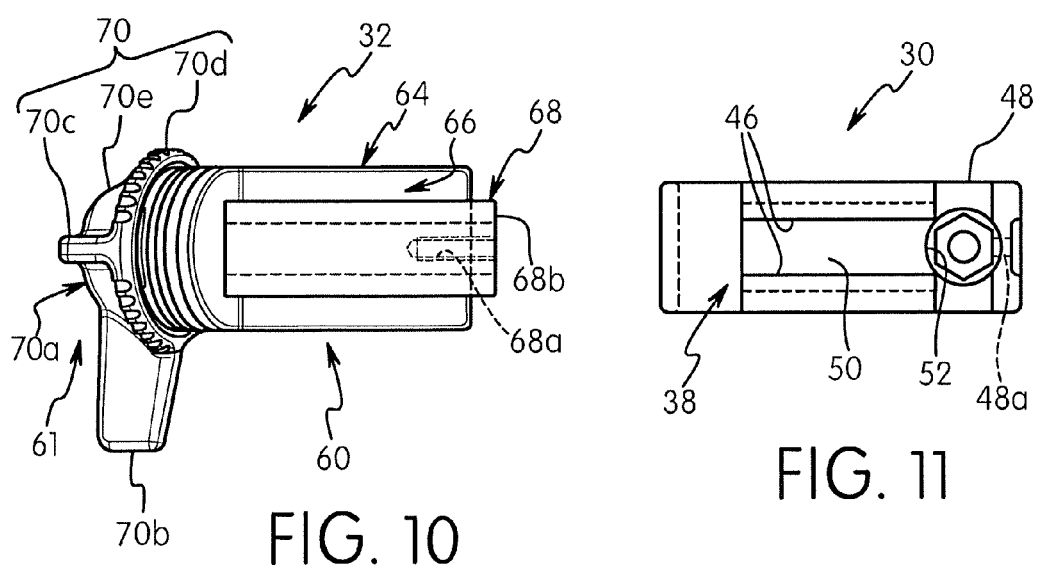
FIG. 10 is a top plan view of the electrical switch portion of the right hand side additional electrical shift control device illustrated in FIG. 9.
FIG. 11 is a bottom plan view of the handlebar mounting portion of the right hand side additional electrical shift control device illustrated in FIG. 9.

The switch mounting structure 38 basically includes a pair of longitudinal rails 46 extending from an abutment member 48 to form a substantially T-shaped longitudinal recess 50 with a single open end. A hexagonal shaped cutout 52 preferably extends through the abutment member 48, the longitudinal recess 50 and partially through the rails 46, as best seen in FIGS. 9 and 11. The nut 42b is received in the cutout 52 prior to attaching the electrical switch portion 32 to the handlebar mounting portion 30. A stepped through bore 48a is formed in the abutment member 48 to receive the fastener 34. The switch mounting structure 38 (i.e., the T-shaped recess 50) preferably forms part of the protrusion and recess arrangement, which couples the handlebar mounting portion 30 with the electrical switch portion 32 mentioned above.

The bicycle computer unit 24 basically includes a computer housing 54 with a display screen 56. The display screen is preferably an LCD display screen. The internal workings of the bicycle computer unit 24 are well known in the art. Thus, the bicycle computer unit 24 will not be discussed and/or illustrated in detail herein, except as related to the present invention. The computer housing 54 basically encloses the internal parts of the bicycle computer unit 24 such as the CPU, ROM, RAM, I/O interface, etc. The bicycle computer unit 24 can be powered by an internal power supply (e.g. a battery) or externally as needed and/or desired. The computer unit 24 receives electrical signals from the various electrical switches of the bicycle 10, processes the signals, and then operates/actuates (i.e., via electrical signals sent through the cords 16a and 20a) the rear and front derailleurs 16 and 20 in a conventional manner.

The computer housing 54 also is utilized to support the bicycle computer unit 24 by the computer support legs 40. In particular, the computer housing 54 includes a bottom surface 54a configured to be coupled to the computer attachment end 40b of the computer support legs 40 as best seen in FIG. 2. In particular, the bottom surface 54a is preferably configured to be snap fit with the computer attachment end 40b, or configured with threaded holes to be attached via fasteners in a conventional manner. In the illustrated embodiment, the computer attachment end 40b of the computer support leg 40 and the bottom surface 54a are preferably configured to be snap-fitted together in a conventional manner. Accordingly, the precise structure of the computer attachment end 40b of the computer support leg 40 as well as the bottom surface 54a will not be discussed and/or illustrated in detail herein, except as related to the present invention.

Figure 8:
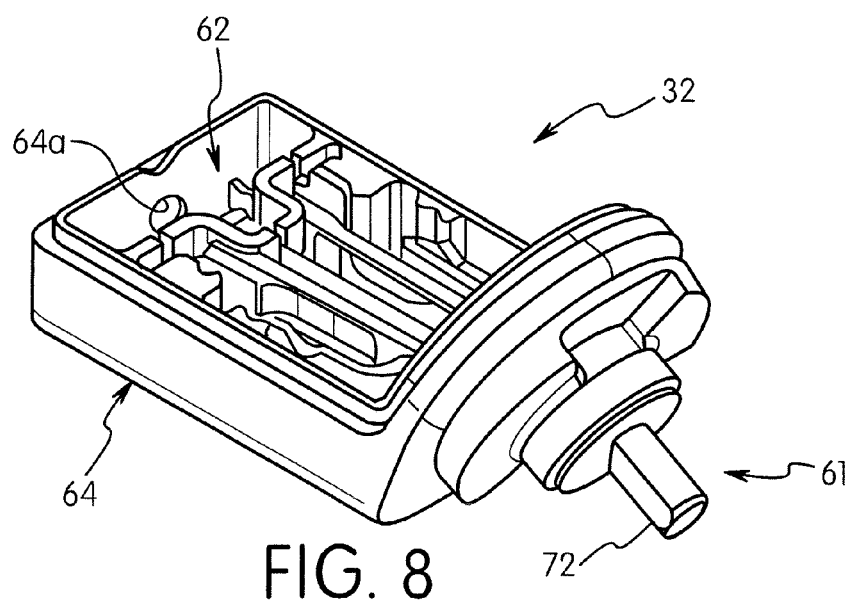
FIG. 8 is an upper, inside perspective view of the electrical switch portion of the right hand side additional electrical shift control device illustrated in FIGS. 4-7, with the cover and cord removed for purposes of illustration.

Referring to FIGS. 2-14, the electrical switch portion 32 will now be explained in more detail. The electrical switch portion 32 is electrically coupled to an electrical cord 58 having an electrical conductor 58a, an electrical conductor 58b and an electrical conductor 58c. The electrical cord 58 is electrically coupled to the bicycle computer unit 24. The electrical switch portion 32 basically includes a housing 60, an operating member 61 and an electrical contact assembly 62, as seen in FIGS. 7 and 8. The operating member 61 is rotatably coupled to the housing 60 and operatively coupled to the electrical contact assembly 62 to be selectively moved relative to the handlebar mounting portion 30 (i.e., to first and second actuating positions from a neutral, rest position). The electrical contact assembly 62 is mounted within the housing 60 and is configured and arranged to be operated by the operating member 61.

Figure 12:
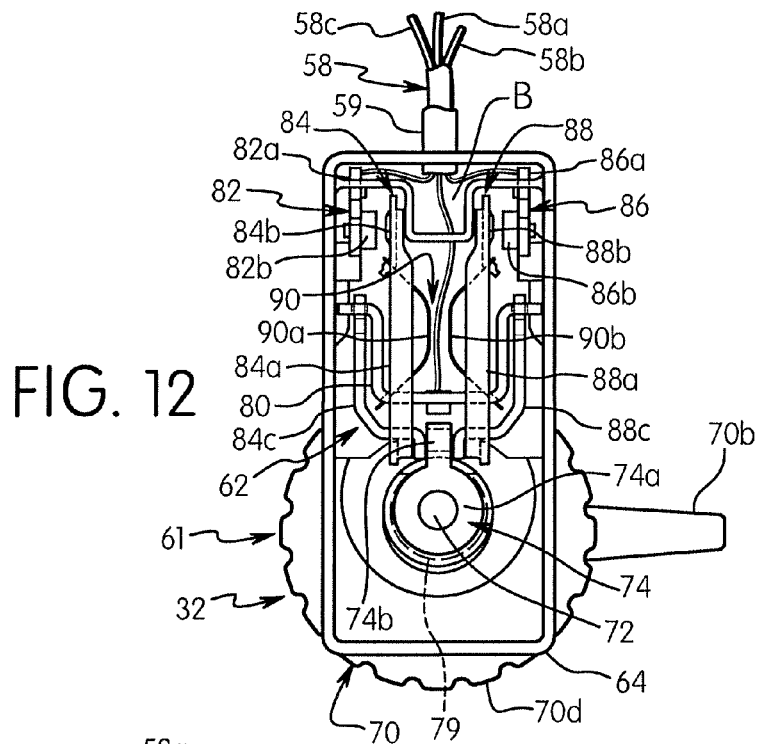
FIG. 12 is an elevational view of the electrical shift control switch illustrated in FIGS. 7 and 8 of the additional right electrical shift control device illustrated in FIGS. 4-11 with the cover element removed and the operating member partially illustrated to show the electrical shift control switch in the neutral position, i.e., the movable contacts spaced from the stationary contacts so that no electrical connection is made between the contacts.
Figure 13:
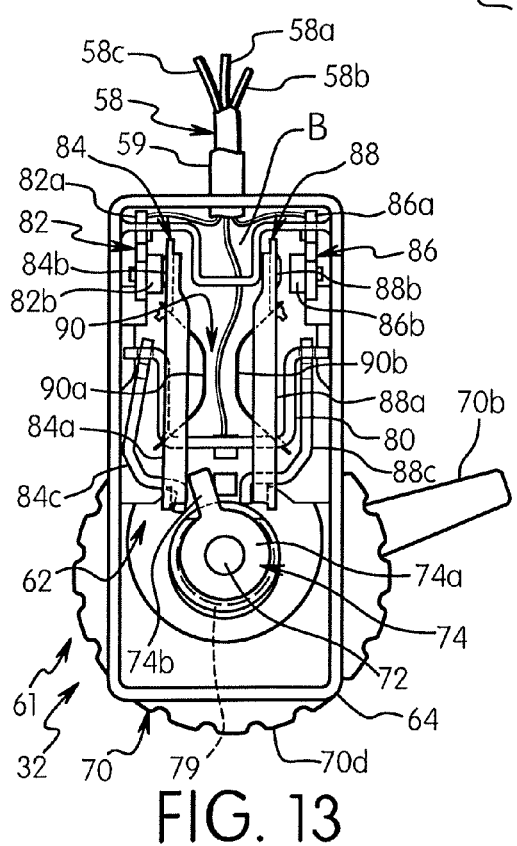
FIG. 13 is an elevational view of the electrical shift control switch illustrated in FIGS. 7 and 8 of the additional right electrical shift control device illustrated in FIGS. 4-11 with the cover element removed and the operating member partially illustrated to show the electrical shift control switch in the first, upshift position, i.e., one of the movable contacts touching one of the stationary contacts so that an electrical connection is established between the contacts.
Figure 14:
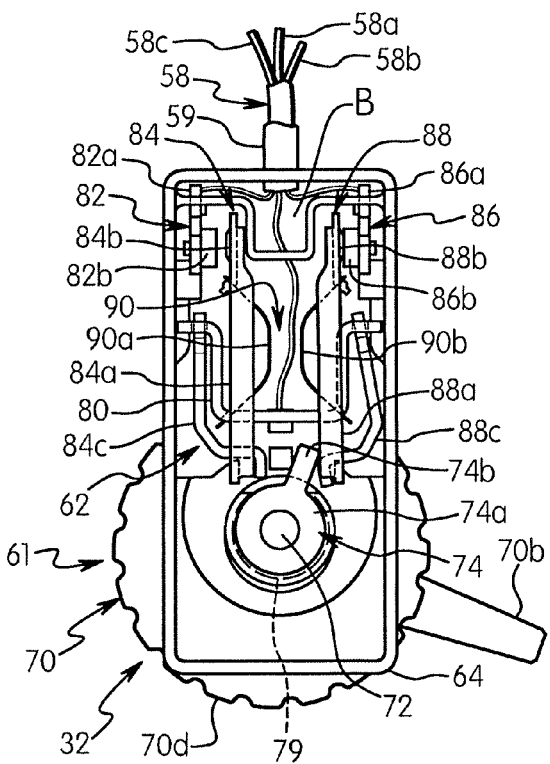
FIG. 14 is an elevational view of the electrical shift control switch illustrated FIGS. 7 and 8 of the additional right electrical shift control device illustrated in FIGS. 4-11 with the cover element removed and the operating member partially illustrated to show the electrical shift control switch in the second, downshift position, i.e., one of the movable contacts touching one of the stationary contacts so that an electrical connection is established between the contacts.
Figure 15:
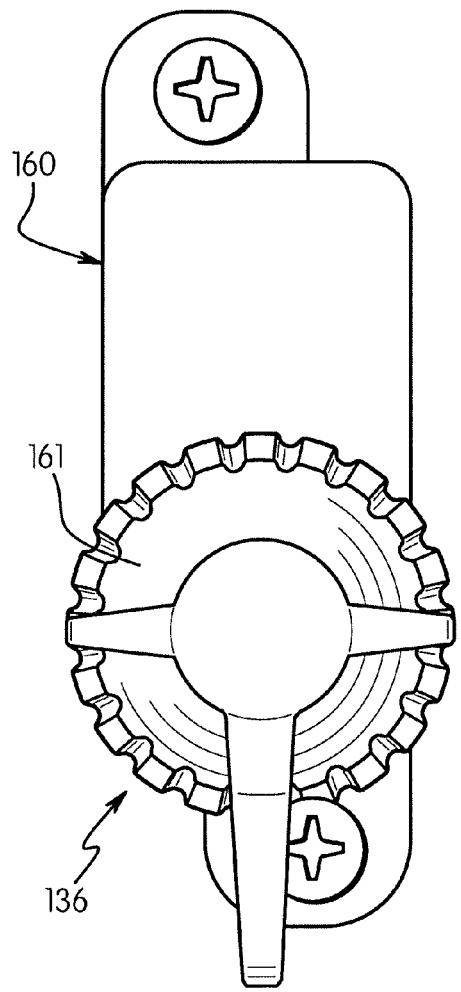
FIG. 15 is an elevational view of one of the electrical shift control switches illustrated in FIG. 2 for either the right or left hand side brake/shift control device in accordance with the present invention.
Figure 16:
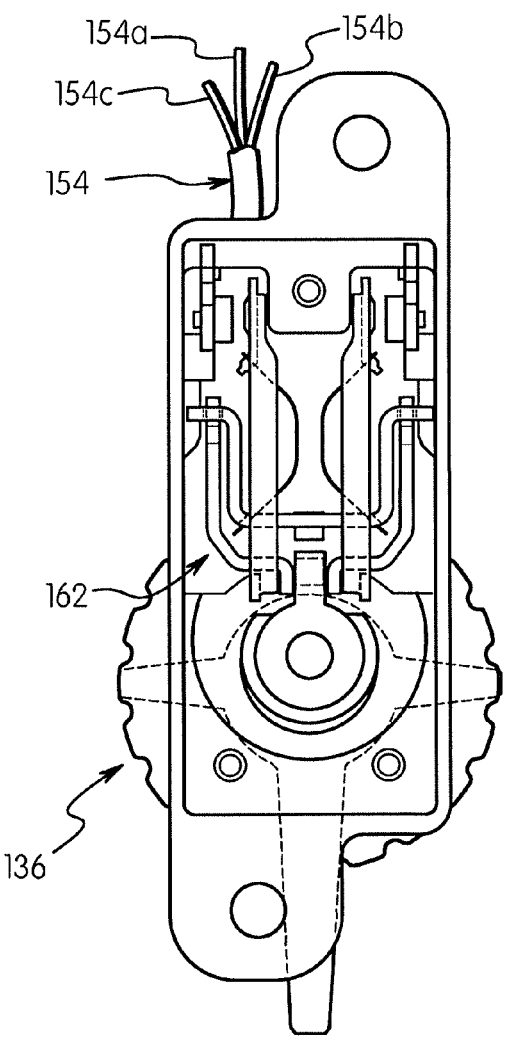
FIG. 16 is an elevational view of the electrical shift control switch illustrated in FIG. 15 with the base removed to show the electrical shift control switch in the neutral position, i.e., the movable contacts spaced from the stationary contacts so that no electrical connection is made between the contacts.

The electrical contact assembly 62 is electrically coupled to the electrical contacts 58a-58c of the electrical cord 58. As explained below in more detail, the electrical switch portion 32 (i.e., the operating member 61) has a first actuating or upshift position, a second actuating or downshift position and a neutral or rest position located between the first and second actuating positions as best seen in FIGS. 12-14. Accordingly, the electrical switch portion 32 (i.e., the operating member 61) can be utilized for both upshifting and downshifting one of the derailleurs 16 and 20. The first and second actuating positions are arranged on opposite sides of the neutral position.

Of course, it will be apparent to those skilled in the art from this disclosure that the upshifting and downshifting positions of the operating member 61 could be reversed if needed and/or desired, depending on how the cord 58 is connected. In other words, the additional electrical shift control devices 13R and 13L are preferably identical, except for the way in which the operating members 61 are configured. Specifically, the operating members 61 are mounted such that they are mirror images of each other. However, the cords 58 can be connected in the same manner or differently so the additional electrical shift control devices 13R and 13L operate in the same manner or slightly different manners. For example, one of the additional electrical shift control devices 13R and 13L can be connected to its respective cord 58 such that a particular actuating movement (e.g., clockwise movement of the operating member 61) produces an upshift, while the other of the additional electrical shift control devices 13R and 13L can be connected to its respective cord 58 such that a particular actuating movement (e.g., clockwise movement of the operating member 61) produces a downshift, and vice versa.

Preferably, the housing 60 is constructed of two pieces. For example, the housing 60 as illustrated, includes a rectangular cup-shaped base element 64 and a rectangular cover element 66 that is coupled to the base element 64. The base element 64 and cover element 66 are each preferably constructed of a hard rigid material such as a hard rigid plastic or metal material. The electrical contact assembly 62 is housed within the housing 60 between the base element 64 and the cover element 66 and electrically coupled to the electrical conductors 58a-58c of the electrical cord 58, as mentioned above. Specifically, the electrical contact assembly 62 is preferably mounted in the base element 64 as seen in FIG. 8. After all electrical connections between the electrical contact assembly 62 and the cord 58 are made, the cover element 66 is fixedly coupled to the base element (e.g., by a snap fit, glue, fasteners, or any other suitable attachment technique).

Preferably, the base element 64 includes a wire opening 64a that is configured and arranged to receive a rubber wire mounting member 59 that has the cord 58 extending outwardly therethrough as best seen in FIG. 7. The wire mounting member 59 seals the wire opening 64a so that a filler material such an epoxy resin filler material can be retained in the area B after all electrical connections between the cord 58 and the electrical switch portion 32 are made.

The cover element 66 includes a substantially T-shaped longitudinal projection (mating mounting structure) 68 with a longitudinally extending threaded blind bore 68a extending from an end surface 68b that is configured to threadedly receive the threaded fastener 34 therein. The projection 68 preferably has a cross-sectional shape identical or substantially identical to the cross-sectional shape of the recess 52 of the switch mounting structure 38 such that the projection 68 constitutes a mating mounting structure that cooperates with the switch mounting structure 38 so as to be slidably removable but retained. In other words, the projection 68 is configured to be slid into the recess 52 until the end surface 68b of the projection 68 contacts the abutment member 48. In this (retained) position, the projection (mating mounting structure) 68 is retained in the recess 52 except in the direction of sliding movement. The fastener 34 is then inserted through the hole 48a of the abutment member 48 into the threaded hole 68a to couple the electrical switch portion 32 to the handlebar mounting portion 30. In other words, after the fastener 34 couples the electrical switch portion 32 to the handlebar mounting portion 30, the electrical switch portion 32 is non-movable relative to the handlebar mounting portion 30. However, if the fastener 34 is subsequently removed, the electrical switch portion 32 is slidable relative to and removable from the handlebar mounting portion 30 (slidable from a retained position to a detached position), without removing the handlebar mounting portion 30 from the handlebar 14.

The T-shaped protrusion 68 and the T-shaped recess 52 form parts of the protrusion and recess arrangement mentioned above. Of course, it will be apparent to those skilled in the art from this disclosure that other types of protrusion and recess arrangements can be used in conjunction with the present invention. For example, the protrusion and recess arrangement illustrated herein could be reversed if needed and/or desired. Furthermore, it will be apparent to those skilled in the art from this disclosure that the protrusion and recess arrangement illustrated herein could be modified without departing from the present invention. For example, the fastener 34 could be eliminated and the protrusion and recess arrangement illustrated herein could be provided with a snap-fit retaining structure (i.e., a bulge/detent arrangement) rather than using a separate fastener.

The operating member 61 protrudes out from the housing 60 such that rotational movement of the operating member 61 causes the electrical contact assembly 62 to move from a normal or rest position to one of the two actuating positions as explained below. The operating member 61 basically has a knob or dial-shaped actuator 70, a pivot shaft 72 and a toggle member 74. The actuator 70 is fixedly attached the outer end of the pivot shaft 72 by a set pin 76 that contacts a flat portion of the outer end of the pivot shaft 72. The inner end of the pivot shaft 72 has the toggle member 74 fixedly coupled thereto. Thus, rotation of the actuator 70 by the rider causes the pivot shaft 72 and the toggle member 74 to rotate therewith.

Preferably, a bearing assembly 78 is positioned between the housing 60 and the pivot shaft 72 such that the operating member 61 pivots or rotates smoothly about a rotational operating axis or pivot axis X. Preferably, the pivot axis X of the operating member 61 is non-parallel to a center axis C of the transverse portion T of the handlebar 14. The pivot axis X preferably intersects the curved mounting surface 36d of the tubular clamping portion 36 such that the operating member 61 is disposed on an opposite side of a plane P from the split S. The plane P is perpendicular to the operating axis X and passes through the center axis C of the transverse portion T of the handlebar 14, as best seen in FIG. 7.

A biasing element (coil spring) 79 is positioned between the housing 60 and the toggle member 74 to normally bias the toggle member 74, and thus, the operating member 61 to the normal rest or neutral position from the first and second actuating positions. In particular, one end of the spring 79 is preferably received in an axial hole (not shown) of the base element 64, while the other end of the spring 79 is preferably received in an axial hole (not shown) of the toggle member 74. The axial holes (not shown) and the spring 79 are preferably arranged and configured to bias the operating member 61 to the neutral rest position from the first and second actuating positions. The spring 79 preferably has a coiled portion with at least two coils.

The toggle member 74 has an annular mounting portion 74a with a radially extending projection 74b extending outwardly from the mounting portion 74a. The mounting portion 74a preferably has a non-circular opening with a portion of the pivot shaft 72 non-rotatably received therein. The projection 74b engages the electrical contact assembly 62 in response to rotation of the operating member 61, as explained below.

The actuator 70 basically includes a dial element 70a, at least one projection 70b and a pair flange elements 70c. The projection 70b extends radially outwardly from the outer edge of the dial element 70a to facilitate engagement with the rider's thumb or fingers. The dial element 70a has a textured outermost edge 70d with a frustaconical surface 70e extending therefrom as best seen in FIGS. 3-6. The flange elements 70c project from the frustaconical surface 70e. The textured outermost edge 70d as well as the flange elements 70c are configured to facilitate engagement with the riders thumb or fingers. The flange elements 70c are circumferentially spaced in opposite directions from the projection 70b. The projection 70b preferably has a maximum radial dimension measured relative to the textured outermost edge 70d that is about the same as a maximum radial dimension of the dial element 70a measured between the pivot axis X and the outermost edge 70d.

As seen in FIGS. 12-14, the electrical contact assembly 62 preferably includes a common contact bar 80, a first stationary contact 82, a first movable (downshift) contact 84, a second stationary contact 86, a second movable (upshift) contact 88 and a biasing element 90 formed of a pair of leaf springs 90a and 90b. Generally, when the electrical switch portion 32 (i.e., the operating member 61) is in the rest/neutral position, the projection 74b of the toggle member 74 (i.e. of the operating member 61) is located centrally between the first and second movable contacts 84 and 88. In particular, the biasing element 90 holds the toggle member 74 of the operating member 61 in the rest position between the first and second movable contacts 84 and 88. The spring 79 also holds the toggle member 74 in the rest position.

However, when the rider rotates the actuator 70 of the operating member 61, this causes the pivot shaft 72 to pivot the toggle member 74 such that the projection 74b is pressed against one of the movable contacts 84 and 88. This pivotal movement of the toggle member 74 causes one of the movable contacts 84 and 88 to be deflected such that the deflected movable contact directly contacts the corresponding one of the stationary contacts 82 and 86. More specifically, when the actuator 70 of the operating member 61 is rotated in a clockwise direction as seen by the rider (FIG. 13), the toggle member 74 deflects the first movable contact 84 such that the first movable contact 84 contacts the first stationary contact 82. The rider's view of the actuator is reversed from that illustrated in FIGS. 12-14. Thus, an electrical connection is made between the first stationary contact 82 and the first movable contact 84 such that a shift control signal is sent to the cycle computer unit 24, which in turn operates one of the derailleurs 16 and 20 to cause a shift to occur. If the actuator 70 of the operating member 61 is rotated in a counterclockwise direction as seen by the rider (FIG. 14), an opposite shift of one of the derailleurs 16 and 20 occurs. In particular, rotation of the actuator 70 of the operating member 61 causes the toggle member 74 to deflect the second movable contact 88 against the second stationary contact 86 to result in an electrical connection therebetween. The rider's view of the actuator is reversed from that illustrated in FIGS. 12-14. This electrical connection causes a control signal to be inputted into the cycle computer unit 24 such that a shift control signal is sent to one of the derailleurs 16 and 20.

The cycle computer unit 24 is electrically coupled to the electrical switch portion 32 via the electrical cord 58, as mentioned above. In particular, the first electrical conductor 58*a* of the electrical cord 58 is electrically connected to the common contact bar 80. The second electrical conductor 58*b* of the electrical cord 58 is electrically connected to the first stationary contact 82, while the third electrical conductor 58*c* of the electrical cord 58 is electrically connected the second stationary contact 86. When the first contacts 82 and 84 are touching, the first conductor 58*a* is electrically connected to the second electrical conductor 58*b* to transmit a downshift control signal to the cycle computer unit 24. On the other hand, when the second contacts 86 and 88 are touching, the first conductor 58*a* is electrically connected to the third electrical conductor 58*c* to transmit an upshift control signal to the cycle computer unit 24.

Basically, the first stationary contact 82 includes a wiring plate 82*a* and a contact element 82*b* with a first stationary engagement surface. The first stationary contact 82 is constructed of a rigid electrical conductive material such as those known in the art. The first stationary contact 82 is fixedly secured to the housing 60 when the base element 64 and the cover element 66 are fixedly coupled together. The second electrical conductor 58*b* of the electrical cord 58 is electrically connected to the first stationary contact 82 by soldering or otherwise attaching the conductor to the wiring plate 82*a*.

The first movable contact 84 includes a first mounting element 84*a* with a contact element 84*b* mounted on one end of the first mounting element 84*a*, and a second mounting element 84*c* coupled to the other end of the first mounting element 84*a*. The elements 84*a*-84*c* of the first movable contact 84 are constructed of rigid electrical conductive materials such that an electrical path is created by these elements. The first mounting element 84*a* is swingably mounted to the common contact bar 80 and the second mounting element 84*c* such that the first mounting element 84*a* moves between a normal or rest position and an actuating position in response to rotation of the actuator 70 of the operating member 61. Thus, the contact element 84*b* has a movable engagement surface that is arranged and configured to move with the first mounting element 84*a* when the operating member 61 is operated. In other words, the movable engagement surface of the contact element 84*b* of the first movable contact 84 selectively moves into electrical engagement with the first stationary engagement surface of the contact element 82*b* of the first stationary contact 82 upon clockwise rotation of the actuator 70 of the operating member 61 to the first actuating position as seen by the rider (FIG. 13).

The second mounting element 84*c* is coupled between the common contact bar 80 and the free end of the first mounting element 84*a* to control the swinging or pivotal movement of the first mounting element 84*a*. Thus, the second mounting element 84*c* is pivotally mounted at its first end to the common contact bar 80 and at its second end to the first mounting element 84*a*. One end of the leaf spring 90*a* of the biasing element 90 is coupled to the common contact bar 80, while the other end of the leaf spring 90*a* is coupled to the first mounting element 84*a* such that the first and second mounting elements 84*a* and 84*c* urge the toggle member 74 of the operating member 61 to the center rest position and the contact element 84*b* out of engagement with the stationary contact element 82*b*.

This arrangement of the leaf spring 90*a* together with the first and second mounting elements 84*a* and 84*c* form an audible clicking element that is configured and arranged to produce an audible sound that occurs upon selective movement of the operating member 61 to the first actuating position. In other words, an audible clicking sound occurs simultaneous with the movable engagement surface of the contact element 84*b* engaging the stationary engagement surface of the contact element 82*b*.

Basically, the second stationary contact 86 includes a wiring plate 86*a* and a contact element 86*b* with a second stationary engagement surface. The second stationary contact 86 is constructed of a rigid electrical conductive material such as those known in the art. The second stationary contact 86 is fixedly secured to the housing 60 when the base element 64 and the cover element 66 are fixedly coupled together. The third electrical conductor 58*c* of the electrical cord 58 is electrically connected to the second stationary contact 86 by soldering or otherwise attaching the conductor to the wiring plate 86*a*.

The second movable contact 88 includes a first mounting element 88*a* with a contact element 88*b* mounted on one end of the first mounting element 88*a*, and a second mounting element 88*c* coupled to the other end of the first mounting element 88*a*. The elements 88*a*-88*c* of the second movable contact 88 are constructed of rigid electrical conductive materials such that an electrical path is created by these elements. The first mounting element 88*a* is swingably mounted to the common contact bar 80 and the second mounting element 88*c* such that the first mounting element 88*a* moves between a normal or rest position and an actuating position in response to rotation of the actuator 70 of the operating member 61. Thus, the contact element 88*b* has a movable engagement surface that is arranged and configured to move with the first mounting element 88*a* when the operating member 61 is operated. In other words, the movable engagement surface of the contact element 88*b* of the second movable contact 88 selectively moves into electrical engagement with the second stationary engagement surface of the contact element 86*b* of the second stationary contact 86 upon counterclockwise rotation of the actuator 70 of the operating member 61 to the second actuating position as seen by the rider (FIG. 14).

The second mounting element 88*c* is coupled between the common contact bar 80 and the free end of the first mounting element 88*a* to control the swinging or pivotal movement of the first mounting element 88*a*. Thus, the second mounting element 88*c* is pivotally mounted at its first end to the common contact bar 80 and at its second end to the first mounting element 88*a*. One end of the leaf spring 90*b* of the biasing element 90 is coupled to the common contact bar 80, while the other end of the leaf spring 90*b* is coupled to the first mounting element 88*a* such that the first and second mounting elements 88*a* and 88*c* urge the toggle member 74 of the operating member 61 to the center rest position and the contact element 88*b* out of engagement with the stationary contact element 86*b*.

This arrangement of the leaf spring 90*b* together with the first and second mounting elements 88*a* and 88*c* form an audible clicking element that is configured and arranged to produce an audible sound that occurs upon selective movement of the operating member 61 to the second actuating position. In other words, an audible clicking sound occurs simultaneous with the movable engagement surface of the contact element 88b engaging the stationary engagement surface of the contact element 86b.

Referring now to FIGS. 1, 2, 15 and 16, the electrical shift/brake control devices 12R and 12L will now be explained in more detail. Basically, each of the electrical shift and brake control devices 12R and 12L includes a support member or brake lever bracket 130, a brake lever 132, and a pair of electrical shift control switches 136. In the control device 12R, the brake cable 18a is fixedly coupled to the brake lever 132 such that the inner wire is pulled when the rider squeezes the brake lever 132. Likewise, the brake cable 22a is fixedly coupled to the brake lever 132 of the control device 12L such that the inner wire is pulled when the rider squeezes the brake lever 132.

As best seen in FIG. 2, the cycle computer unit 24 is electrically coupled to the first and second electrical shift control switches 136 and 138 of each of the control devices 12R and 12L via a pair of electrical cords 154.

In particular, each of the electrical cords 154 has a pair of first electrical conductors 154a, a pair of second electrical conductors 154b and a pair of third electrical conductors 154c, which are electrical coupled to the electrical shift control switches 136 and 138. Each cord 154 connects one of the electrical shift control switches 136 and the electrical shift control switches 138 to the bicycle computer 24. When one of the first conductors 154a is electrically connected to one of the second electrical conductors 154b via the electrical shift control switch 136 or 138, then a downshift signal is transmitted to the cycle computer unit 24. On the other hand, when one of the first conductors 154a is electrically connected to one of the third electrical conductors 154c via the electrical shift control switch 136 or 138, then an upshift signal is transmitted to the cycle computer unit 24. The cycle computer unit 24, the electrical switch portions 32, the first electrical shift control switches 136 and 138 form parts of the electrical shift control system of the present invention.

Figure 22:
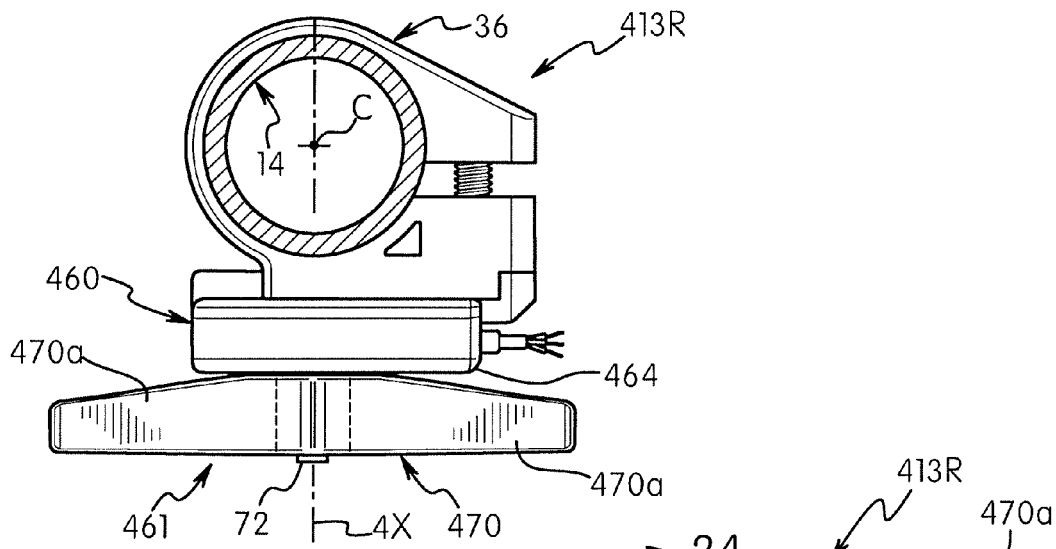
FIG. 22 is a right side elevational view of a right hand side additional electrical shift control device coupled to the handlebar in accordance with a fourth preferred embodiment of the present invention.

Basically, each of the electrical shift control switches 136 and 138 includes a housing 160, an operating member 161 and an electrical contact assembly 162, as seen in FIG. 22. The operating member 161 is rotatably coupled to the housing 160 and operatively coupled to the electrical contact assembly 162. The electrical contact assembly 162 mounted within the housing 160 and configured and arranged to be operated by the operating member 161. The construction of the electrical contact assembly 162 is the same as the electrical contact assembly 62, discussed above. Thus, the electrical shift control switches 136 and 138 will not be discussed or illustrated in detail herein. Rather the construction and operation of the electrical shift control switches 136 and 138 can be readily determined from the description of the electrical contact assembly 62, discussed above.

Second Embodiment

Figure 17:
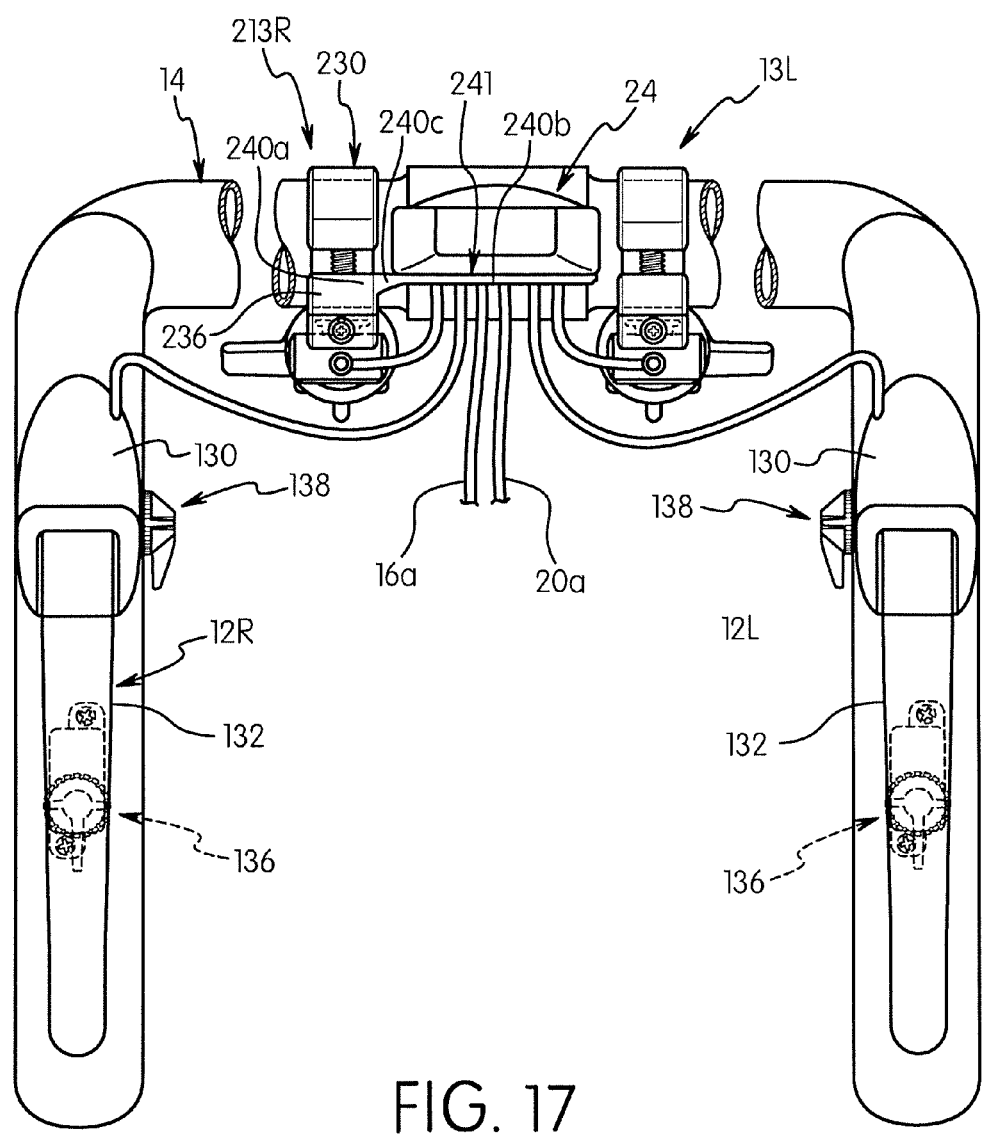
FIG. 17 is a partial enlarged front elevational view of a handlebar equipped with a pair of brake/shift control devices coupled to the handlebar, a pair of additional electrical shift control devices mounted to the transverse portion of the handlebar and a cycle computer supported by one of the additional electrical shift control devices in accordance with a second preferred embodiment of the present invention.
Figure 18:
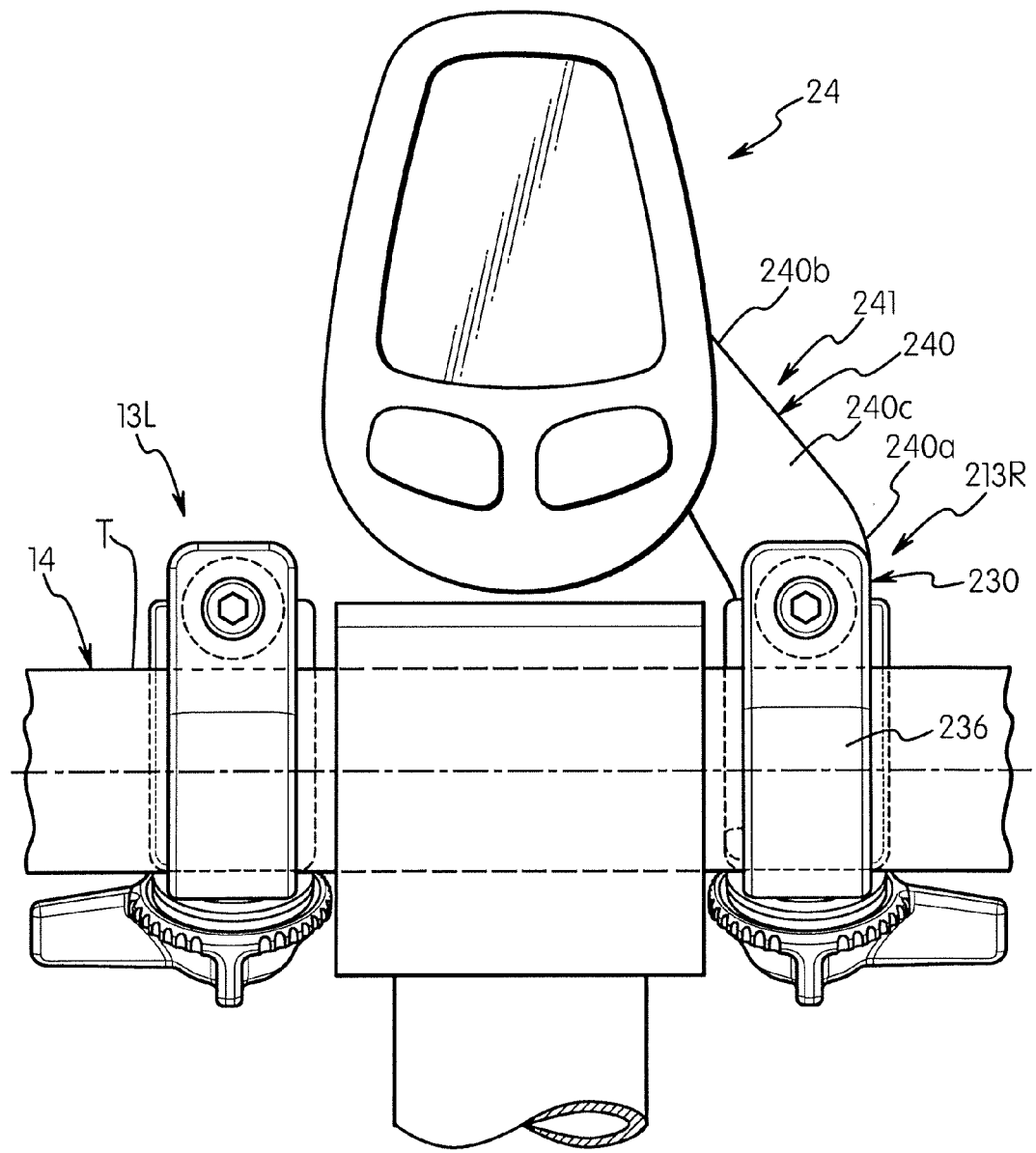
FIG. 18 is an enlarged top plan view of the center portion of the handlebar illustrated in FIG. 17 with the additional electrical shift control devices and the bicycle computer coupled thereto in accordance with the present invention.

Referring now to FIGS. 17 and 18, an additional bicycle shift control device 213R is illustrated in accordance with a second embodiment of the present invention is illustrated. This second embodiment is identical to the first embodiment of the present invention except that the computer support member 41 of the first embodiment has been replaced with a modified computer support member 241 in this second embodiment. Otherwise, this second embodiment is identical to the first embodiment. Accordingly, this second embodiment will not be discussed and/or illustrated in detail herein. Rather, it will be apparent to those skilled in the art from this disclosure that the descriptions and illustrations of the first embodiment also apply to this second embodiment, except as explained and illustrated herein. Identical parts of the first and second embodiments will be referenced with identical reference numerals.

The modified computer support member 241 is identical to the computer support member 41 of the first embodiment, except that one of the computer support legs 40 of the first embodiment has been eliminated and the computer support member 241 is integrally formed with a handlebar mounting portion 230 of the right shift control device 213R. Accordingly, the resilient elements 44 of the first embodiment can be eliminated in this second embodiment. Moreover, the left shift control device 13L of the first embodiment is used in this second embodiment, except it does not support the bicycle computer 24. The handlebar mounting portion 230 of the right shift control device 213R is identical to the handlebar mounting portion 30 of the first embodiment, except that the handlebar mounting portion 230 has the computer support member 241 integrally formed therewith. Thus, the handlebar mounting portion 230 will not be discussed in further detail herein.

The computer support member 241 basically includes a computer support leg 240 with a bicycle attachment end 240a, a computer attachment end 240b and a bent section 240c disposed between the bicycle attachment end 240a and the computer attachment end 240b. The computer attachment end 240b supports the computer 24 in a manner identical to the first embodiment. The bicycle attachment end 240a is integrally formed with a tubular clamping portion 236 of the handlebar mounting portion 230. Thus, the computer support leg 240 of this second embodiment is identical to the right computer support leg 40 of the first embodiment, except the left computer support leg 4-0 of the first embodiment has been eliminated and the bicycle attachment end 240a is integrally formed with a tubular clamping portion 236 of the handlebar mounting portion 230. Accordingly, this second embodiment will not be discussed in further detail herein.

Of course, it will be apparent to those skilled in the art from this disclosure that the computer support member could be integrally formed with part of the additional left shift control device instead of the additional right shift control device if needed and/or desired. Moreover, it will be apparent to those skilled in the art from this disclosure that the computer support member could be integrally formed with parts of both the left and right shift control devices if needed and/or desired. In such an arrangement, the computer support member should have a configuration similar to the first embodiment, but should be fixed to or integrally formed with both the handlebar support portions of the shift control devices.

Third Embodiment

Figure 19:
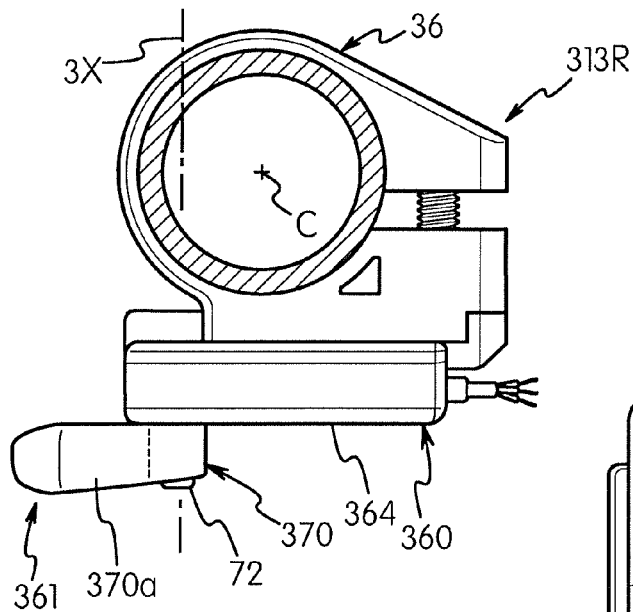
FIG. 19 is a right side elevational view of a right hand side additional electrical shift control device coupled to the handlebar in accordance with a third preferred embodiment of the present invention.
Figure 20:
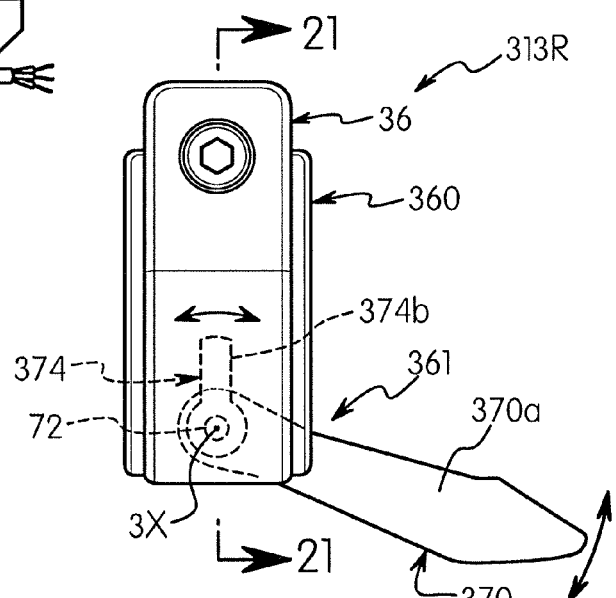
FIG. 20 is a top plan view of the right hand side additional electrical shift control device illustrated in FIG. 19, with the handlebar removed for the purpose of illustration.
Figure 21:
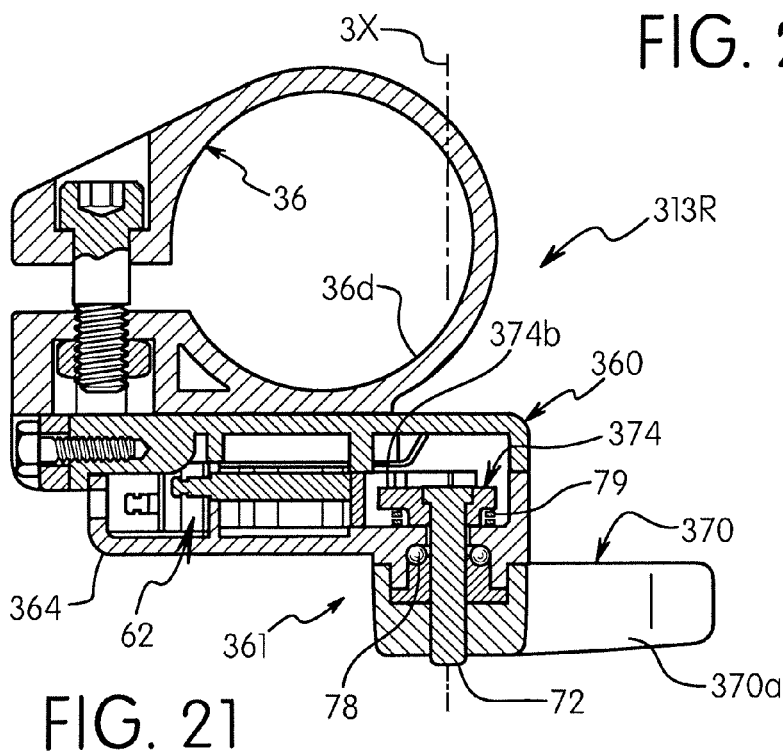
FIG. 21 is a cross-sectional view of the right hand side additional electrical shift control device illustrated in FIGS. 19 and 20 as seen along section line 21-21 of FIG. 20.

Referring now to FIGS. 19-21, an additional bicycle shift control device 313R is illustrated in accordance with a third embodiment of the present invention. The shift control device 313R illustrated herein is preferably a right side device. However, it will be apparent to those skilled in the art from this disclosure that the shift control device 313R is preferably utilized in conjunction with a modified left additional shift control device (not shown) that is a mirror image of the shift control device 313R. Moreover, it will be apparent to those skilled in the art from this disclosure that the cycle computer 24 of the first and second embodiments is preferably supported by the shift control device 313R and the modified left additional shift control device (not shown) in accordance with the first embodiment or the second embodiment. In other words, this third embodiment is identical to the first embodiment of the present invention except that the operating member 61 with the actuator 70 of the first embodiment has been replaced with a modified operating member 361 with a modified lever-shaped actuator (element) 370 that rotates about a rotation axis 3X in this third embodiment.

The inclination of the rotation axis 3X is oriented differently in this third embodiment relative to the center axis C of the handlebar 14 than the rotation axis X of the first embodiment. However, this third embodiment operates in a manner substantially identical to the first embodiment. Accordingly, this third embodiment will not be discussed and/or illustrated in detail herein. Rather, it will be apparent to those skilled in the art from this disclosure that the descriptions and illustrations of the first embodiment also apply to this third embodiment, except as explained and illustrated herein. Identical parts of the first and third embodiments will be referenced with identical reference numerals. Parts that are functionally identical will be referenced with identical reference numerals but with "300" added to them. Parts of this third embodiment that are functionally identical to parts of the first embodiment can be better understood from the descriptions and illustrations of the first embodiment, if needed.

The operating member 361 protrudes out from a modified housing 360 such that rotational movement of the operating member 361 causes the electrical contact assembly 62 to move from a normal or rest position to one of the two actuating positions, in a manner similar to the first embodiment. The operating member 361 basically has the lever-shaped actuator 370, the pivot shaft 72 of the first embodiment and a modified toggle member 374. The actuator 370 is fixedly attached the outer end of the pivot shaft 72 by a set pin (not shown) that contacts a flat portion of the outer end of the pivot shaft 72 in a manner identical to the first embodiment. The actuator 370 basically includes a lever-shaped element 370a configured and arranged to facilitate engagement with the rider's thumb and/or fingers (preferably the rider's thumb).

The inner end of the pivot shaft 72 has the toggle member 374 fixedly coupled thereto. Thus, rotation of the actuator 370 by the rider causes the pivot shaft 72 and the toggle member 374 to rotate therewith. The toggle member 374 is identical to the toggle member 74 of the first embodiment, except the toggle member 374 has a shorter radially extending projection 374b due to the location and orientation of the operating axis 3X. The projection 374b engages the electrical contact assembly 62 in response to rotation of the operating member 361 in a manner identical to the first embodiment. Thus, the toggle member 374 will not be discussed in further detail herein.

Preferably, the bearing assembly 78 that is used in the first embodiment is positioned between the housing 360 and the pivot shaft 72 such that the operating member 361 pivots or rotates smoothly about the rotational/operating axis or pivot axis 3X. Preferably, the pivot axis 3X of the operating member 361 is non-parallel to the center axis C of the transverse portion T of the handlebar 14. The pivot axis 3X preferably intersects the curved mounting surface 36d of the tubular clamping portion 36.

The biasing element (coil spring) 79 that is used in the first embodiment is also used in this embodiment. Specifically, the biasing element 79 is positioned between the housing 360 and the toggle member 374 to normally bias the toggle member 374 to the normal rest or neutral position from the first and second actuating positions. Thus, the operating member 361 is normally maintained in the normal rest or neutral position, similar to the first embodiment, as discussed above. In particular, one end of the spring 79 is preferably received in an axial hole (not shown) of a modified base element 364 of the housing 360, while the other end of the spring 79 is preferably received in an axial hole (not shown) of the toggle member 374. The axial holes (not shown) and the spring 79 are preferably arranged and configured to bias the operating member 361 to the neutral rest position from first and second actuating positions in a manner identical to the first embodiment. The spring 79 preferably has a coiled portion with at least two coils.

Fourth Embodiment

Figure 23:
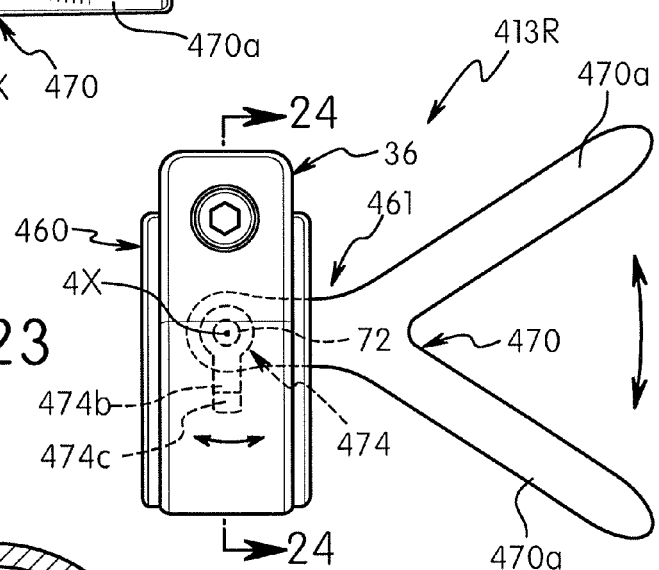
FIG. 23 is a top plan view of the right hand side additional electrical shift control device illustrated in FIG. 22, with the handlebar removed for the purpose of illustration.
Figure 24:
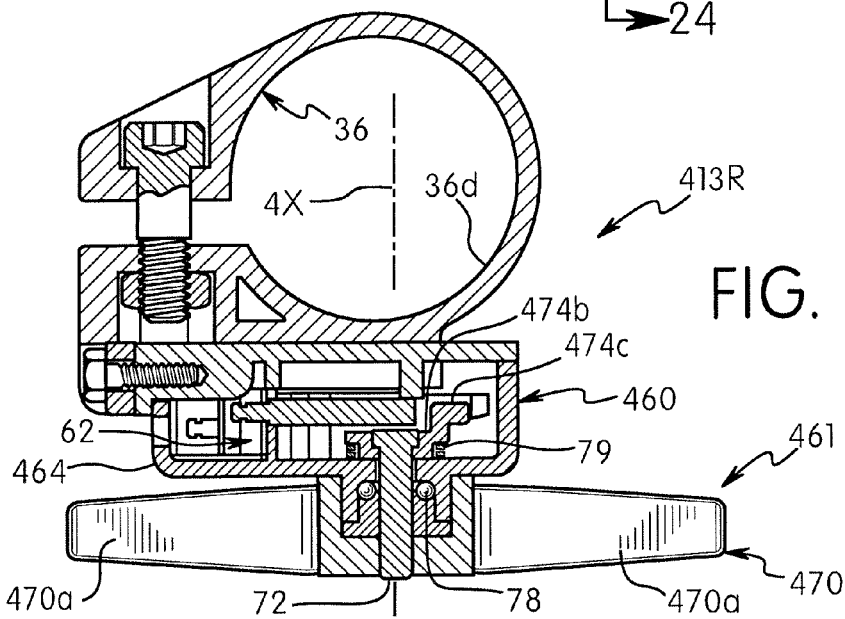
FIG. 24 is a cross-sectional view of the right hand side additional electrical shift control device illustrated in FIGS. 22 and 23 as seen along section line 24-24 of FIG. 23.

Referring now to FIGS. 22-24, an additional bicycle shift control device 413R is illustrated in accordance with a fourth embodiment of the present invention. The shift control device 413R illustrated herein is preferably a right side device. However, it will be apparent to those skilled in the art from this disclosure that the shift control device 413R is preferably utilized in conjunction with a modified left additional shift control device (not shown) that is a mirror image of the shift control device 413R. Moreover, it will be apparent to those skilled in the art from this disclosure that the cycle computer 24 of the first and second embodiments is preferably supported by the shift control device 413R and the modified left additional shift control device (not shown) in accordance with the first embodiment or the second embodiment. In other words, this fourth embodiment is identical to the first embodiment of the present invention except that the operating member 61 with the actuator 70 of the first embodiment has been replaced with a modified operating member 461 with a modified lever-shaped actuator (element) 470 that rotates about a rotation axis 4X in this fourth embodiment.

The inclination of the rotation axis 4X is oriented differently in this fourth embodiment relative to the center axis C of the handlebar 14 than the rotation axis X of the first embodiment. However, this fourth embodiment operates in a manner substantially identical to the first embodiment. Accordingly, this fourth embodiment will not be discussed and/or illustrated in detail herein. Rather, it will be apparent to those skilled in the art from this disclosure that the descriptions and illustrations of the first embodiment also apply to this fourth embodiment, except as explained and illustrated herein. Identical parts of the first and fourth embodiments will be referenced with identical reference numerals. Parts that are functionally identical will be referenced with identical reference numerals but with "400" added to them. Parts of this fourth embodiment that are functionally identical to parts of the first embodiment can be better understood from the descriptions and illustrations of the first embodiment, if needed.

The operating member 461 protrudes out from a modified housing 460 such that rotational movement of the operating member 461 causes the electrical contact assembly 62 to move from a normal or rest position to one of the two actuating positions, in a manner similar to the first embodiment. The operating member 461 basically has the lever-shaped actuator 470, the pivot shaft 72 of the first embodiment and a modified toggle member 474. The actuator 470 is fixedly attached the outer end of the pivot shaft 72 by a set pin (not shown) that contacts a flat portion of the outer end of the pivot shaft 72 in a manner identical to the first embodiment. The actuator 470 basically includes a pair of finger operated lever-shaped elements 470a configured and arranged to facilitate engagement with the rider's thumb or fingers. The actuator 470 preferably has a V-shape as seen in FIG. 23 such that one of the elements 470a can be actuated by the rider's thumb, while the other element 470a can be actuated by the rider's finger(s).

The inner end of the pivot shaft 72 has the toggle member 474 fixedly coupled thereto. Thus, rotation of the actuator 470 by the rider causes the pivot shaft 72 and the toggle member 474 to rotate therewith. The toggle member 474 is identical to the toggle member 74 of the first embodiment, except the toggle member 474 has an axially extending part 474c extending from a radially extending projection 474b due to the location and orientation of the operating axis 4X. The axially extending part 474c selectively engages the electrical contact assembly 62 in response to rotation of the operating member 461 in a manner substantially identical to the first embodiment. Thus, the toggle member 474 will not be discussed in further detail herein.

Preferably, the bearing assembly 78 that is used in the first embodiment is positioned between the housing 460 and the pivot shaft 72 such that the operating member 461 pivots or rotates smoothly about the rotational/operating axis or pivot axis 4X. Preferably, the pivot axis 4X of the operating member 461 is non-parallel to the center axis C of the transverse portion T of the handlebar 14. The pivot axis 4X preferably intersects the curved mounting surface 36d of the tubular clamping portion 36. Moreover, the pivot axis 4X preferably substantially passes through the center axis C of the handlebar 14 to form a substantially right angle relative thereto.

The biasing element (coil spring) 79 that is used in the first embodiment is also used in this embodiment. Specifically, the biasing element 79 is positioned between the housing 460 and the toggle member 474 to normally bias the toggle member 474 to the normal rest or neutral position from the first and second actuating positions. Thus, the operating member 461 is normally maintained in the normal rest or neutral position, similar to the first embodiment, as discussed above. In particular, one end of the spring 79 is preferably received in an axial hole (not shown) of a modified base element 464 of the housing 460, while the other end of the spring 79 is preferably received in an axial hole (not shown) of the toggle member 474. The axial holes (not shown) and the spring 79 are preferably arranged and configured to bias the operating member 461 to the neutral rest position from first and second actuating positions in a manner identical to the first embodiment. The spring 79 preferably has a coiled portion with at least two coils.

GENERAL INTERPRETATION OF TERMS

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% to 10% of the modified term if this deviation would not negate the meaning of the word it modifies. The term "actuating position" as used herein means a state in which an electrical connection is formed by an orientation of an operation member. The term "neutral position" as used herein means a state in which an electrical connection is not formed by an orientation of an operation member.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. An electrical bicycle shift control device comprising:
    a mounting portion including a tubular clamping member configured to be selectively clamped onto a bicycle handlebar and a switch mounting structure fixedly coupled to the tubular clamping member; and
    an electrical shift control switch portion including a mating mounting structure coupled to the switch mounting structure and an operating member arranged and configured to move relative to the mounting portion between a neutral position and a first actuating position,
    the mating mounting structure of the electrical shift control switch portion being slidably coupled to the switch mounting structure when a fastener is removed, and the mating mounting structure of the electrical shift control switch portion being non-movably attached to the mounting portion when the fastener is installed without removing the mounting portion from the bicycle handlebar.

2. The electrical bicycle shift control device according to claim 1, wherein
    the mating mounting structure and the switch mounting structure include a protrusion and recess arrangement.

3. The electrical bicycle shift control device according to claim 1, wherein
    the operating member is further arranged and configured to be selectively moved relative to the mounting portion between the neutral position and a second actuating position that is spaced from the first actuating position.

4. The electrical bicycle shift control device according to claim 3, wherein
    the electrical shift control switch portion further includes a biasing element arranged and configured to urge the operating member to the neutral position.

5. The electrical bicycle shift control device according to claim 4, wherein
    the operating member of the electrical shift control switch portion is further arranged and configured to rotate about an operating axis between the neutral position and the first and second actuating positions.

6. The electrical bicycle shift control device according to claim 5, wherein
    the operating axis of the operating member is non-parallel to a center axis of the bicycle handlebar.

7. The electrical bicycle shift control device according to claim 4, wherein
    the operating member of the electrical shift control switch portion is further arranged and configured such that the first and second actuating positions are arranged on opposite sides of the neutral position.

8. The electrical bicycle shift control device according to claim 1, wherein
    the operating member of the electrical shift control switch portion is further arranged and configured to rotate about an operating axis between the neutral position and the first actuating position.

9. The electrical bicycle shift control device according to claim 8, wherein
    the operating member has a dial element with at least one projection extending radially outwardly from the dial element relative to the operating axis.

10. The electrical bicycle shift control device according to claim 9, wherein the dial element has a flange element extending outwardly therefrom that is circumferentially spaced from the projection about the operating axis.

11. An electrical bicycle shift control assembly comprising:
a first shift control device including a first mounting portion having a first tubular clamping member configured to be selectively clamped onto a bicycle handlebar and a first electrical shift control switch attached to the first tubular clamping member of the first mounting portion, the first tubular clamping member having a pair of attachment ends and a band section extending between the attachment ends to form a split between the attachment ends, the tubular clamping member being arranged and configured such that the attachment ends move toward each other to reduce an effective inner diameter of a curved mounting surface of the band section, with the split extending outwardly from the curved mounting surface so that the split is disposed radially outwardly of an outer surface of the bicycle handlebar relative to a longitudinal center axis of the handlebar when the first tubular clamping member is clamped onto the bicycle handlebar; and
a bicycle computer unit including a display screen, the bicycle computer unit being attached to a computer support leg of the first mounting portion, with the computer support leg being removeably secured within the split between the attachment ends so that the computer support leg is disposed radially outwardly of the outer surface of the bicycle handlebar when the first tubular clamping member is clamped onto the bicycle handlebar and the computer support leg is secured within the split.

12. The electrical bicycle shift control assembly according to claim 11, further comprising
a second shift control device including a second mounting portion having a second tubular clamping member configured to be selectively clamped onto the bicycle handlebar and a second electrical shift control switch mounted to the second mounting portion,
the bicycle computer unit being supported between the first and second shift control devices by at least the first mounting portion.

13. The electrical bicycle shift control assembly according to claim 11, wherein
the computer support leg includes a bent section such that the bicycle computer unit is longitudinally offset from the band section along the bicycle handlebar.

14. The electrical bicycle shift control assembly according to claim 11, wherein
the first electrical shift control switch includes a first operating member arranged and configured to move relative to the first mounting portion between a first neutral position and a first actuating position.

15. The electrical bicycle shift control assembly according to claim 14, wherein
the first operating member is further arranged and configured to be selectively moved relative to the first mounting portion between the first neutral position and a second actuating position that is spaced from the first actuating position.

16. The electrical bicycle shift control assembly according to claim 15, wherein
the first electrical shift control switch further includes a first biasing element arranged and configured to urge the first operating member to the first neutral position.

17. The electrical bicycle shift control assembly according to claim 11, wherein the first electrical shift control switch is slidably coupled to the first mounting portion when a fastener is removed and the first electrical shift control switch is non-movably attached to the mounting portion when the fastener is installed without removing the first mounting portion from the bicycle handlebar.

18. An electrical bicycle shift control assembly comprising:
a first shift control device including a first mounting portion configured to be selectively secured to a first bicycle portion of a bicycle and a first electrical shift control switch portion mounted to the first mounting portion; and
a bicycle computer unit including a display screen being supported by the first mounting portion
the first electrical shift control switch portion including a first operating member arranged and configured to move relative to the first mounting portion between a first neutral position and a first actuating position, the first operating member of the first electrical shift control switch portion being further arranged and configured to rotate about a first operating axis between the first neutral position and the first actuating position.

19. The electrical bicycle shift control assembly according to claim 18, wherein
the first operating member has a first dial element with at least one first projection extending radially outwardly from the first dial element relative to the first operating axis.

20. The electrical bicycle shift control assembly according to claim 19, wherein
the first dial element has a flange element extending outwardly therefrom that is circumferentially spaced from the first projection about the operating axis.

21. An electrical bicycle shift control device comprising:
a mounting portion including a tubular clamping member configured to be selectively clamped onto a bicycle handlebar, the tubular clamping member having a first attachment end, a second attachment end and a band section extending between the first and second attachment ends to form a split between the first and second attachment ends, the tubular clamping member being arranged and configured such that the first and second attachment ends move toward each other to reduce an effective inner diameter of a curved mounting surface of the band section; and
an electrical shift control switch portion coupled to the mounting portion, the electrical shift control switch portion including an operating member arranged and configured to move relative to the mounting portion between a neutral position and a first actuating position,
the operating member including a dial-shaped element that is configured and arranged to rotate about an operating axis to move the operating member between the neutral position and the first actuating position, the operating member being disposed on an opposite side of a plane from the split, the plane passing through a center axis of the handlebar and being perpendicular to the operating axis.

22. The electrical bicycle shift control device according to claim 21, wherein
the dial-shaped element has at least one projection extending radially outwardly from the dial-shaped element relative to the operating axis.

23. The electrical bicycle shift control device according to claim 22, wherein the dial element has a flange element extending outwardly therefrom that is circumferentially spaced from the projection about the operating axis.

24. The electrical bicycle shift control device according to claim 22, wherein
the at least one projection has a radial dimension that is about the same as a maximum radial dimension of the dial-shaped element as measured relative to the operating axis.

25. The electrical bicycle shift control device according to claim 21, wherein
the tubular clamping member of the mounting portion includes a curved mounting surface extending about a central axis to contact the bicycle handlebar and the operating axis is non-parallel to the central axis.

26. The electrical bicycle shift control device according to claim 25, wherein
the operating axis intersects the curved mounting surface of the mounting portion.

27. The electrical bicycle shift control device according to claim 21, wherein
the electrical shift control switch portion is slidably coupled to the mounting portion when a fastener is removed and the electrical shift control switch portion is non-movably attached to the mounting portion when the fastener is installed without removing the mounting portion from the bicycle handlebar.

28. The electrical bicycle shift control device according to claim 21, wherein
the operating member is further arranged and configured to be selectively moved relative to the mounting portion between the neutral position and a second actuating position that is spaced from the first actuating position.

29. The electrical bicycle shift control device according to claim 28, wherein
the electrical shift control switch portion further includes a biasing element arranged and configured to urge the operating member to the neutral position.

30. The electrical bicycle shift control device according to claim 29, wherein
the dial-shaped element of the operating member is further arranged and configured to rotate about the operating axis to move the operating member between the neutral position and the first and second actuating positions.

* * * * *